(12) United States Patent
Brems et al.

(10) Patent No.: US 7,526,306 B2
(45) Date of Patent: Apr. 28, 2009

(54) PUSH TO TALK USER INTERFACE

(75) Inventors: Doug Brems, San Diego, CA (US);
David Schumann, San Diego, CA (US);
Tony Lee, San Diego, CA (US); Rory O'Neill, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 433 days.

(21) Appl. No.: 11/008,340

(22) Filed: Dec. 8, 2004

(65) Prior Publication Data

US 2005/0143135 A1    Jun. 30, 2005

Related U.S. Application Data

(60) Provisional application No. 60/528,055, filed on Dec. 8, 2003.

(51) Int. Cl.
*H04B 7/00*    (2006.01)
(52) U.S. Cl. .................. 455/518; 455/519; 455/550.1; 455/551
(58) Field of Classification Search .............. 455/550.1, 455/551, 564, 90.2
See application file for complete search history.

(56) References Cited

U.S. PATENT DOCUMENTS 6,298,228 B1 * 10/2001 Singh ...................... 455/403

(Continued)

FOREIGN PATENT DOCUMENTS

EP    792056 A2 *    8/1997

(Continued)

OTHER PUBLICATIONS

Teltarif.De, "Nokia 5140: Erstes Gsm-Handy mit Push-to-Talk-Funktion", Internet Website Publication (http://www.teltarif.de/arch/2003/kw46/s12051.html), XP002327740, pp. 1-2 (Nov. 12, 2003).

(Continued)

*Primary Examiner*—Matthew D Anderson
*Assistant Examiner*—April S Guzman

(57) ABSTRACT

A push to talk (PTT) user interface for a wireless communications device utilizes a single all contacts database. The database is updated and utilized by the user in either a "PTT contacts" list screen or in an "all contacts" list screen. These screens are used for direct PTT calls, group PTT calls, alert calls, and standard cellular voice calls. Push to talk contacts are defined by the user and are stored on the wireless device. A direct PTT call allows a user to place a PTT call to another party or to a group with more than one party. The user can create a group "ad hoc" PTT call by selecting multiple contacts from the PTT contacts list screen. The PTT contact screen also is utilized to send an "alert" message to an individual with a PTT contact number. The alert message is either a brief text message or simply an "Alert" without text. During a PTT call, the user can view a variety of screens to add another party to the active PTT call and to save or edit participant information. When a user has missed a group call, the user can join the call late by using a call history list. During an active PTT call, the wireless communications device provides notification of other incoming PTT calls, and allows the user to "answer", i.e., switch, to the new call.

19 Claims, 22 Drawing Sheets

U.S. PATENT DOCUMENTS

| | | | | |
|---|---|---|---|---|
| 6,330,322 | B1 * | 12/2001 | Foladare et al. | 379/211.01 |
| 7,136,475 | B1 * | 11/2006 | Rogers et al. | 379/213.01 |
| 7,146,181 | B2 * | 12/2006 | Schaedler et al. | 455/466 |
| 2002/0077158 | A1 * | 6/2002 | Scott | 455/567 |
| 2003/0119540 | A1 * | 6/2003 | Mathis | 455/518 |
| 2004/0266468 | A1 * | 12/2004 | Brown et al. | 455/518 |
| 2005/0143111 | A1 * | 6/2005 | Fitzpatrick et al. | 455/518 |
| 2005/0143135 | A1 * | 6/2005 | Brems et al. | 455/564 |
| 2005/0164682 | A1 * | 7/2005 | Jenkins et al. | 455/412.1 |
| 2006/0003783 | A1 * | 1/2006 | Fukui et al. | 455/517 |
| 2006/0111135 | A1 * | 5/2006 | Gray et al. | 455/519 |
| 2007/0049335 | A1 * | 3/2007 | Haitani et al. | 455/556.2 |

FOREIGN PATENT DOCUMENTS

| | | |
|---|---|---|
| EP | 1 069 749 A1 | 1/2001 |
| EP | 1069749 A1 * | 1/2001 |

OTHER PUBLICATIONS

Nokia, "Nokia 5140 Bedienungsanleitung", Internet Website Publication (http://nds1.nokia.com/phones/files/guides/Nokia_5140_UG_de.pdf), XP002327740, pp. 1-74 (Nov. 12, 2003).

* cited by examiner

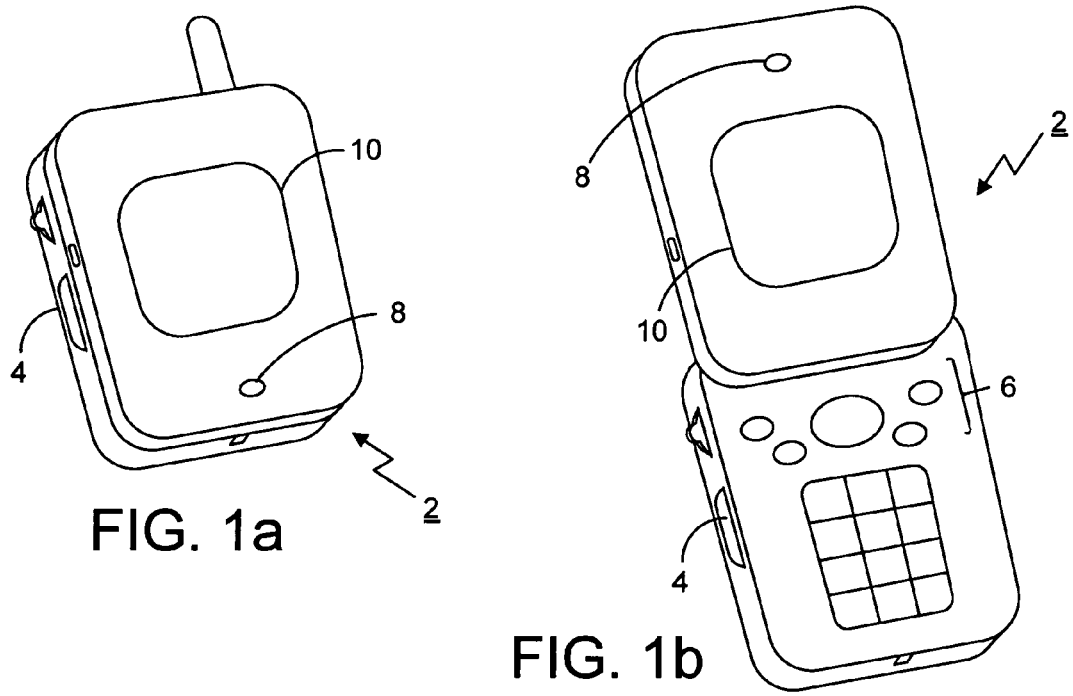
FIG. 1a
FIG. 1b
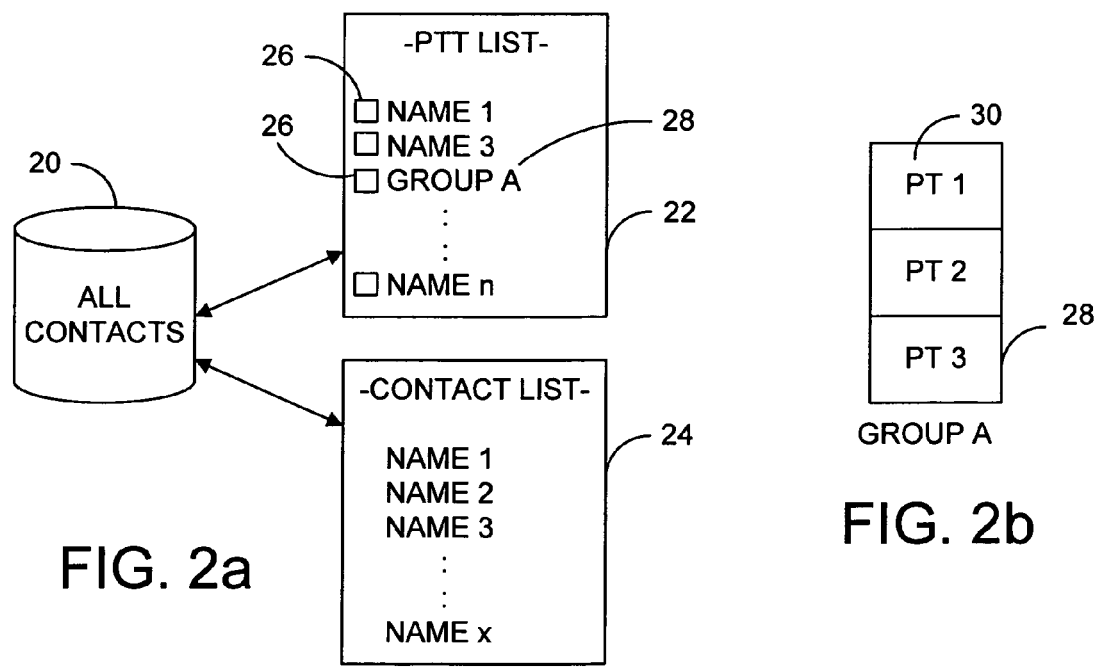
FIG. 2a
FIG. 2b

PUSH TO TALK USER INTERFACE

RELATED APPLICATIONS

This application claims the benefit under 35 U.S.C. 119(e) to U.S. Provisional Application No. 60/528,055, filed on Dec. 8, 2003 which is incorporated herein by reference in its entirety.

FIELD OF THE INVENTION

This invention relates generally to telecommunications systems, and more specifically to a user interface for a push to talk enabled wireless communications device.

BACKGROUND

Wireless communications devices, such as the cellular handsets, allow users to communicate in a variety of ways including real time full duplex voice conversations, pages, and text messaging. Communications also may be provided utilizing half duplex push to talk (PTT) functionality, that is, where a user can speak with another user or groups of users by simply pushing a button on his or her handset. Push to talk functionality is similar to that utilized in walkie-talkie communications. Specifically, only one party at a time can be heard when he or she "seizes the floor" by pressing and holding a PTT button. Once the button is released, the other participants in the PTT call have the opportunity to speak.

Push to talk capability offers the advantages of immediacy for short, straightforward communications, and for efficient group communications. While a conventional voice call may last for approximately two and one half minutes, an average PTT call may last for approximately thirty seconds. A PTT-enabled handset allows a caller to press and hold a button and to start talking within a few seconds of deciding to communicate, and even before the receiving party has taken any action to accept the incoming call. In this way, the customer experience for PTT is much more "immediate" than a conventional voice call which requires the caller to wait for the receiving party to answer the call. Thus, push to talk communications are favorable for immediate, straightforward communications, whereas conventional voice phone calls are favorable for longer conversations.

Unlike traditional voice calls, push to talk communication is an efficient method for quickly communicating with a group of people. Traditional group calls, or "conference calls," often require coordination of a number of individuals who must decide to speak at a particular date and time, to dial-up a specific conference phone number, and possibly, to enter a unique access code to identify their group. In comparison, group push to talk calls are spontaneous and immediate at the press of a button. An individual can initiate a PTT call to the group within a few seconds of identifying a need for a group communication with little or no coordination required among the group.

Despite the growing popularity of push to talk communications, prior art communication devices, and their respective user interfaces (UI) provided by service providers, do not support the means to utilize the above stated PTT technology to its fullest advantages. For example, referring to FIG. 3a, a first carrier provides a single data base 58 that stores all contacts. The individual contacts 52 are presented on the display 50 to a user in a single list format. The user must determine which contacts are PTT contact numbers as indicated by, for example, small icons 54 adjacent each contact. A single list is cumbersome to use since the user must scroll through all contacts to find a specific PTT contact. In addition, groups of users are defined by a talk group number 56 which must be set up by the user's cellular service provider. Thus, the PTT service illustrated in FIG. 3a does not allow a user to quickly access a PTT contact. This type of service also does not allow a user to define his or her own talk groups on an ad hoc basis.

FIG. 3b illustrates a current PTT service alternative. Two separate databases 60, 64 are maintained. A phone contact database 62 stores all of the phone contact information, and a PTT contact database 68 stores all of the PTT contact information. The information in the two databases 60, 64 is not shared. Thus, the user must access the phone book screen 62 to place a call to a phone contact, and/or to update the phone contact data. Similarly, the user must access the PTT contact screen 68 to place a PTT call, and/or to update the PTT contact data. This type of a configuration necessitates that the user maintain separate entries in both databases for a same contact 66. Thus, for example, if a user wishes to enter contact information for a contact 2, then the basic information, such as the contact name, etc., must be entered in each database.

Therefore a need exists for a user interface that advances the use of push to talk technology by providing a quick easy efficient means for accessing, storing, and initiating contact with individuals or groups of individuals.

SUMMARY

PTT user interfaces and supporting processes of one of the embodiments of the present invention utilizes a single contact list database which may be updated and utilized by the user in either a "PTT contacts" list screen or in an "all contacts" list screen. These screens are utilized for direct push to talk calls, group push to talk calls, alert calls and standard cellular calls. A direct PTT call allows a user to place a PTT call to just one other user. A group "ad hoc" PTT call allows a user to place a PTT call to a group of users by selecting each user. A caller can "alert" an individual by sending a brief text message to another user or by sending an alert without a text message.

Push to talk contacts are defined by the user and are stored on the wireless communication device, e.g., a cellular handset. The user also can define an ad hoc PTT group and store it on the handset. In one embodiment, when a PTT direct call is received, the name of the caller is displayed on the handset. If the Session Initiated Protocol (SIP) Uniform Resource Locator (URL) is included in the user's contact list, then the handset's stored name associated with that SIP URL is displayed. Otherwise, the name portion of that SIP URL is displayed as the name. When a PTT group call is received, the name of the call originator is displayed.

During a group call, the user can choose to view the participants of the active call. When a user has missed a group call, the user can join the call late by using a call history list. In addition, the user can add another member to an active PTT call. During an active PTT call, the wireless communications device provides notification of other incoming PTT calls, and allows the user to "answer", i.e., switch, to the new call.

An embodiment of the present invention also provides a user with the capability of upgrading a non-enabled PTT device to a PTT enabled device by downloading a PTT client application and a phone specific user interface client. The PTT client interacts with the network PTT server by establishing PTT calls. The phone specific user interface client defines the exact user interface, e.g., in-call screens, as described herein for one or more types of cellular phones.

BRIEF DESCRIPTION OF THE DRAWINGS

The structure and operation of a preferred embodiment of the present invention will be better understood from the following detailed description taken in conjunction with the accompanying drawings in which like reference numerals refer to like parts.

FIG. 1a is an illustration of a PTT wireless communications device in a closed position.

FIG. 1b is the PTT wireless communications device of FIG. 1a in an open position.

FIG. 2a is a block diagram of a user interface of a preferred embodiment of the present invention utilizing a single database used for both a phone contact list and a PTT contact list.

FIG. 2b is an illustration of a group entry utilizing pointers.

DETAILED DESCRIPTION

Figure 3A:
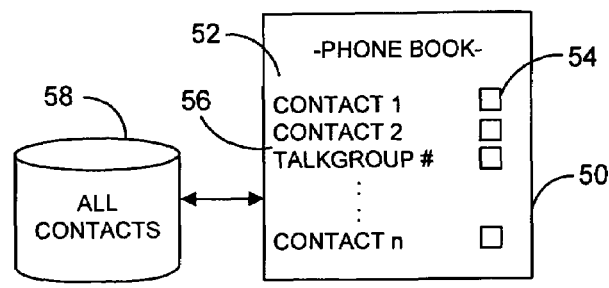
FIG. 3a is a block diagram of a PTT user interface of the prior art utilizing a single database and a single phone list.
Figure 3B:
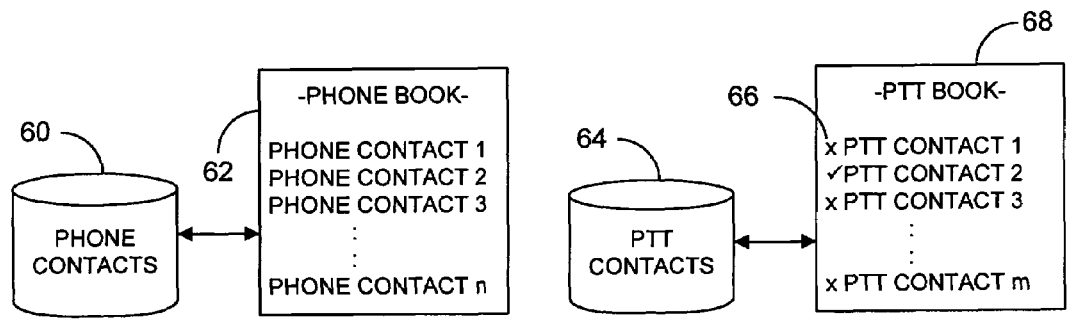
FIG. 3b is a block diagram of a PTT user interface of the prior art utilizing two databases and two contact screens.

The following detailed description utilizes a number of acronyms which are generally known in the art. While definitions are typically provided with the first instance of each acronym, for convenience, Table 1 below provides a list of the acronyms and abbreviations and their respective definitions.

TABLE 1

| Acronym | Definition |
| --- | --- |
| DB | Database |
| IS | Internet Service |
| OEM | Original Equipment Manufacturer |
| OS | Operating System |
| PTT | Push To Talk |
| SIP | Session Initiated Protocol |
| UI | User Interface |
| URL | Uniform Resource Locator |
| VOIP | Voice Over Internet Protocol |

Certain embodiments as disclosed herein provide for a wireless communication device and a user interface for push to talk communication. After reading this description it will become apparent to one skilled in the art how to implement the invention in various alternative embodiments and alternative applications. However, although various embodiments of the present invention will be described herein, it is understood that these embodiments are presented by way of example only, and are not limitations. As such, this detailed description of various alternative embodiments should not be construed to limit the scope or breadth of the present invention as set forth in the appended claims.

FIGS. 1a and 1b illustrate a mobile communications device 2, also referred to herein as a handset, wireless communications device, mobile phone, cellular phone, etc., of an embodiment of the present invention. A push to talk session may be controlled by a dedicated PTT external button 4 or key in either a closed configuration of FIG. 1*a*, or an opened configuration of FIG. 1*b*. Also, standard keys 6 such as the "send" button, "end" button, and soft keys may also be used as part of the PTT service as described further below. The handset display 10 provides constant feedback screens to the user on the state of the PTT call. In addition, a speakerphone 8 or ear piece speaker (not shown) of the handset provides audio feedback to the user in the form of varying tones depending upon the current action or status of a call. In one embodiment of the invention, tones for a push to talk application include a speak tone, a floor available tone, a floor unavailable tone, a received alert tone, an sent alert tone and a call arrival tone. In alternate embodiments of the invention the ear piece speaker is also the speakerphone.

Figure 33:
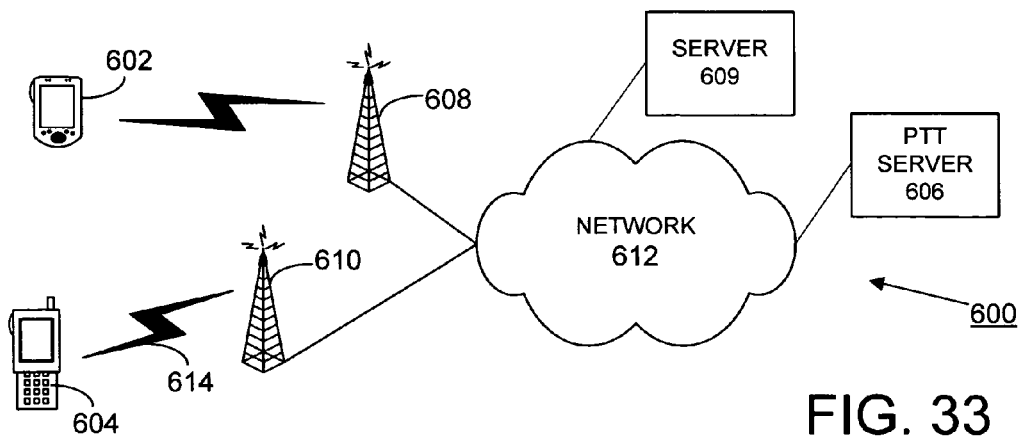
FIG. 33 illustrates a wireless communications network utilized with an embodiment of a PTT enabled wireless device.

FIG. 33 is a high level block diagram illustrating an example wireless communication network 600 that may be used with the communications device 2 of FIGS. 1*a* and 1*b*. The illustrated wireless communication network 600 comprises a plurality of wireless communication devices 602 and 604. The network wireless communication network 600 additionally comprises a plurality of base stations 608 and 610 that are coupled by a server 609 over a network 612. The base stations 608 and 610 communicatively link the handsets 602 and 604 to the server 609. A PTT server 606 provides PTT service to registered handsets 602, 604.

FIG. 2*a* is a high level block diagram of the user interface of a preferred embodiment of a PTT enabled wireless communication device 2. The device utilizes a single database 20 to store all contact information. The database is accessible through at least two different screens, including a PTT list screen 22 and an all contacts list screen 24. In other embodiments, not shown, the all contacts database 20 may be used to present other contact lists, such as all phone contacts, etc. The PTT list includes individual contacts as well as group contacts 28. As explained in detail below, a user can select PTT contacts in an ad hoc manner by simply selecting/checking a box 26 associated with each listed name or group. The single database 20, and multiple access through various screens, improves the ease of use of the PTT functionality that is not present in the prior art PTT enabled handsets.

FIG. 2*b* illustrates the manner in which the database stores the members of a group 28. Specifically, the group consists of pointers 30 that point to the member contact information in the database 20. This ensures that updates to a member contact is automatically reflected in a group lists. Further, this structure relieves the user from adding a contact to a variety of lists as is necessary in the prior art PTT systems.

Figure 5:
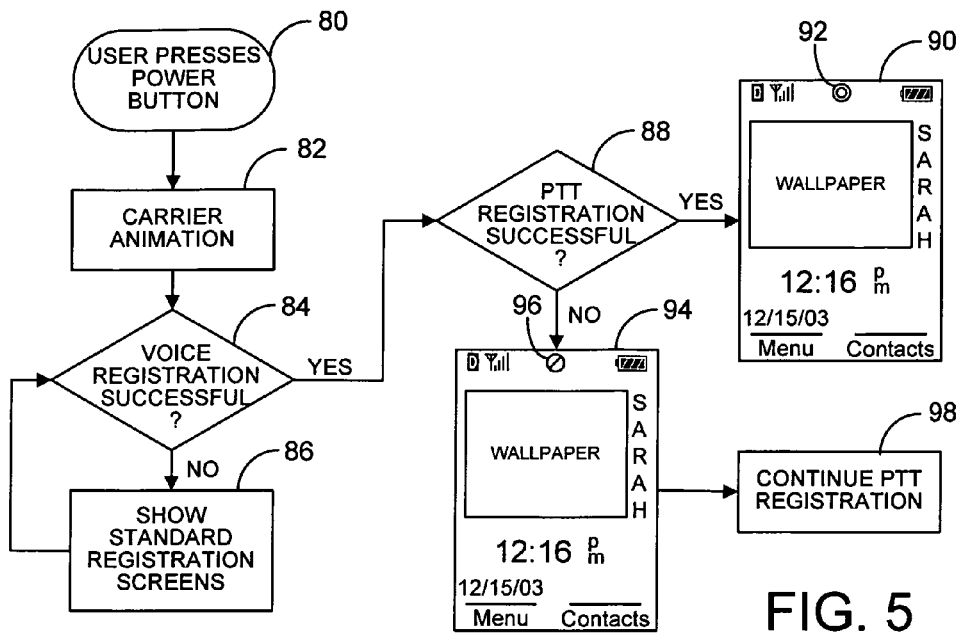
FIG. 5 is a flow diagram of a power up process for a PTT wireless communication device.

FIG. 5 illustrates a flow diagram for a power up condition of an embodiment of the present invention. When the phone is powered up (or powered down) 80, the phone shows a splash screen animation 82 that has been provided by a carrier. Voice registration is initiated 84 and standard registration screens are shown 86 until voice registration is successful. When the PTT feature is enabled, the handset attempts to contact the PTT server 88 after successful voice registration. If PTT registration is successful, a start up screen 90 is displayed with a PTT service icon 92. The service icon 92 provides indication that the user has registered for PTT and the handset is PTT enabled. If registration is not successful, a PTT "no service" icon 96 on the start up screen 94 to provide indication that PTT cannot be used. If the handset is not PTT enabled, The user can request to register for PTT 98 by pressing the PTT button 4, as shown in FIG. 1, and the user interface will initiate a PTT registration process. During any temporary periods when PTT service is not available, the "PTT service icon" 92 will change to the "no PTT service icon" 96.

The phone information screen (not shown) of a preferred embodiment of the invention includes the user's cellular phone number as well as the user's PTT address in the form of xxxxx@xxxxx.com, where the PTT address is correctly populated with the specific SIP URL for that handset. The user can save a default domain for the PTT address field. In other words, when the user manually enters a new PTT address (i.e., a SIP URL) to be stored in the handset's contact list, the handset will provide a default domain name that the user can edit when adding any new contact. The user may edit the default domain name to be a different string. For example, if the user normally places PTT calls to handsets that have a SIP domain name of @supercarrier.com", then the user can change the default domain name for the handset to "@supercarrier.com".

Figure 6:
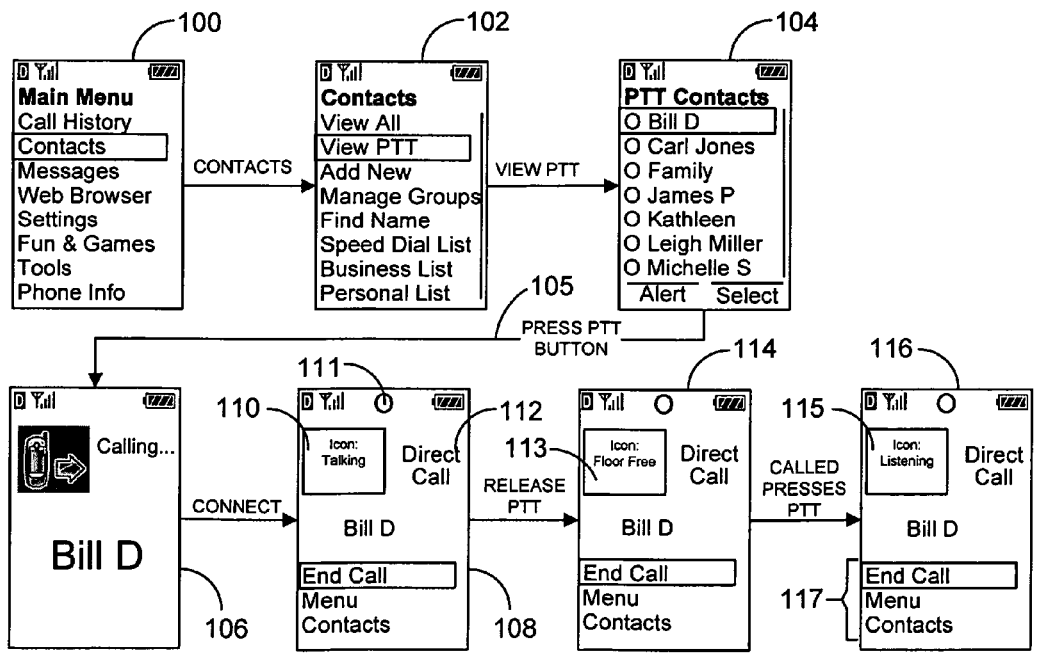
FIG. 6 illustrates is a flow diagram of a PTT direct call when the call origination is from a "view PTT" contact list.

FIG. 6 illustrates is a flow diagram of a PTT direct call, that is, a private PTT call. A user can place a PTT call by selecting "menu" on the handset standby screen 90, 94, as shown in FIG. 5. From the main menu screen 100, the user selects "Contacts". The contacts screen 102 then lists a number of options including a "View PTT" option, also referred to herein as "View PTT Contacts". If the user selects the "View PTT Contacts" option, the PTT Contacts are listed on the PTT contacts screen 104. As shown in FIG. 6, a contact "Bill D" is highlighted. If the user presses the PTT button 105, a PTT call is initiated to "Bill D", and a calling screen 106 is displayed to inform the user of the state of the call. The contact "Bill D" may also be selected for an ad hoc group call by placing a checkmark to the left of the contact name as discussed further below. Once the user is connected with the contact, a direct call screen 108 is displayed. One embodiment of the user interface of the present invention sounds a "speak tone" and shows the type of call, e.g., direct call 112, and the contact name "Bill D". A "talking" icon 110 in the display indicates that the user is talking, that is, the user has the floor. Once the PTT button is released, the direct call screen 114 shows that the floor is free for either participant to speak as indicated by the display "floor free" icon 113. When the called party presses his or her PTT button, in this example Bill D, the direct call screen 116 then indicates that the called party is speaking by displaying a "listening" icon 115 to indicate that the user must now listen.

Continuing with FIG. 6, the PTT service icon 111 in the direct call screens 108, 114, 116 indicates when a PTT call is active. In one embodiment, the service icon 111 continuously flashes during an active PTT call. In other embodiments of the invention a "speak" tone and a "floor free" tone are sounded in addition to the display of the icons 110, 113 to give the user both visual and audio cues. The in call screens 108, 114, 116 also include soft options such as end call, menu and contacts. Selecting "end call" ends the direct call. Selecting menu or contacts during an active call changes the display to the main menu screen and the contacts screen, respectively. These options allow the user to manage PTT contact information before, during or after a call.

Figure 4:
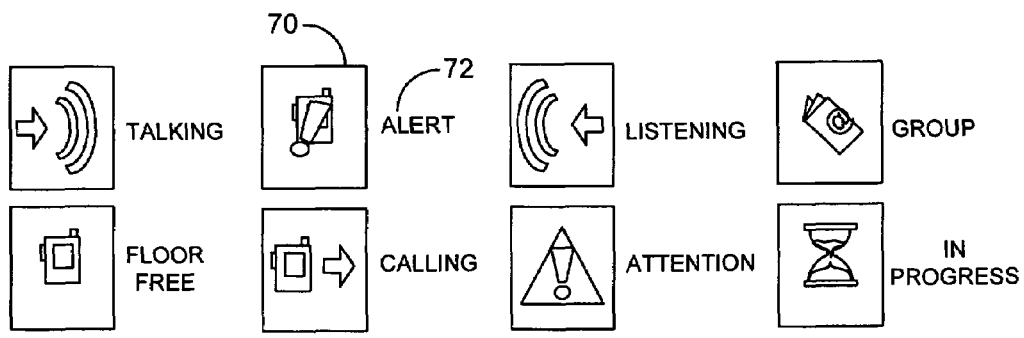
FIG. 4 is an illustration of various icons that may be utilized with the PTT user interface.

A push to talk enabled hand set of one embodiment of the invention includes a variety of icons 70 to support the PTT service, as shown in FIG. 4. The icons shown are illustrative of the type of icons that may available. Unlike the prior art PTT user interfaces, the icons 70 provide a user with easily recognizable feedback as to the status of the push to talk communication. As shown in FIG. 4, the icon for talking indicates that the user has the floor, that is, he or she is pressing the PTT button 4. The floor fee icon indicates that any participant of the PTT call may now press a PTT on his or her handset 2 and begin speaking. The listening icon indicates that someone else has the floor in the PTT call. A group icon designates that the group contact list is being reviewed or manipulated. The calling icon is displayed when a call is being placed. The in progress icon is displayed whenever an action is in progress. The attention icon informs the user that a specific action may be required. The alert icon shows that a PTT alert has been received from another user. If text is included, the text is shown on the display 10 of the handset. The user can press the PTT button 4 to start talking to the person who sent the alert. A preferred embodiment of the invention may include a variety of additional icons including icons to indicate that PTT service is currently enabled or currently not available, the PTT speakerphone is currently on or currently off, the current PTT session is either an individual or a group, call history lists for "one on one" incoming, outgoing, and missed PTT calls, and call history lists for "group" incoming, outgoing, and missed PTT calls.

Figure 7:
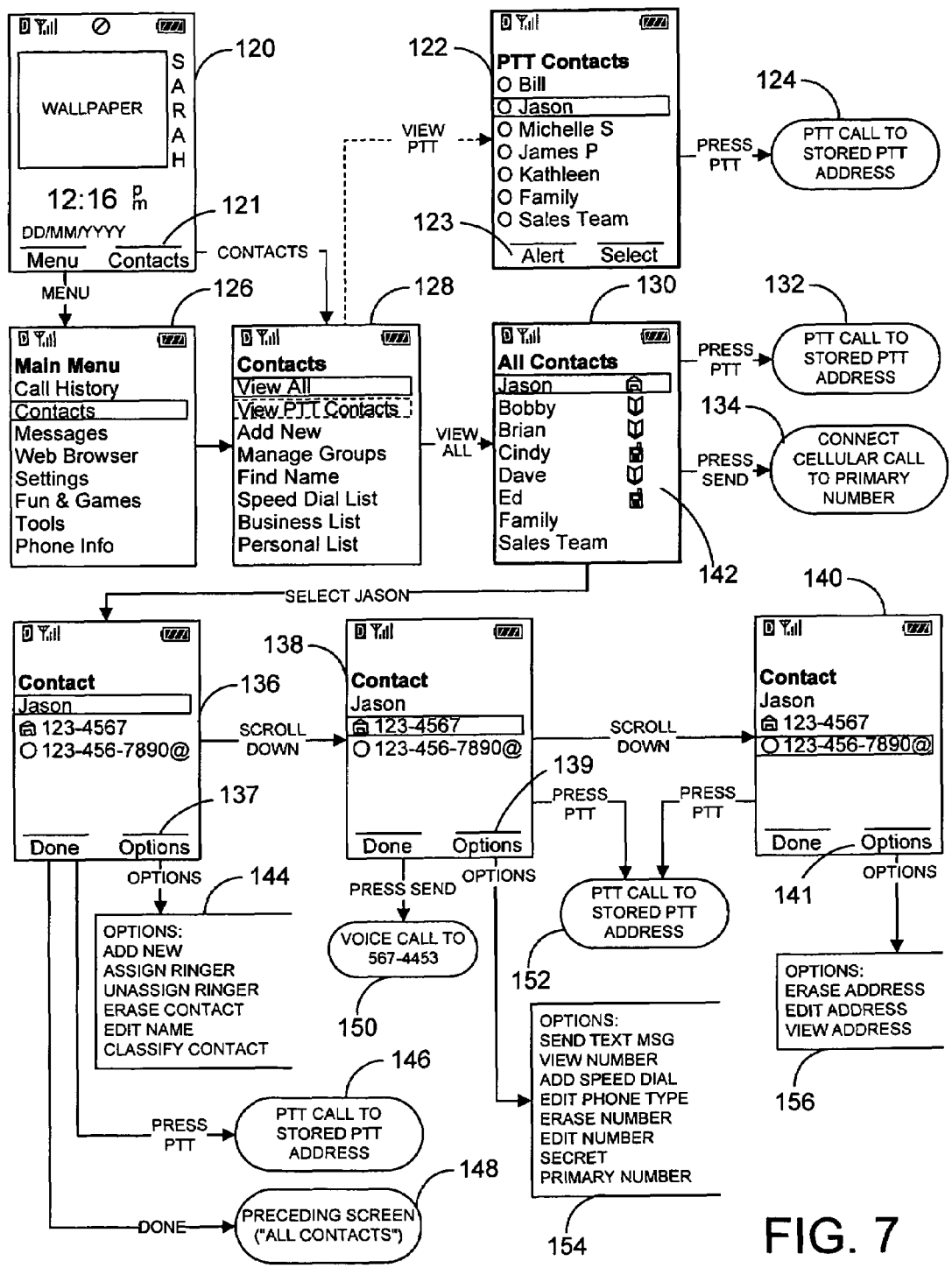
FIG. 7 illustrates a flow diagram of finding contact information from the PTT Contacts or All Contacts list in order to place a PTT call or a standard voice call.

A user can also place a PTT call from the all contacts screen 130 as illustrated in the flow diagram of FIG. 7. From the start up screen 120, the user can select the menu of contacts soft options 121. Selecting the menu option brings up the main menu screen 126. From the main menu screen 126, the user can select the contacts option to display the contacts screen 128. The contacts screen 128 can be viewed by selecting the contacts soft option 121 on the start up screen 120. From the contacts screen 128, the user can scroll down the options list. A first option "view all" brings up the all contacts screen 130. Selecting the "View PTT Contacts" option results in the display of the PTT contacts screen. FIG. 7 illustrates a method of the system of FIG. 2a. That is, one database 20 is used for displaying and managing the two contact lists of PTT contacts 22 and all contacts 24.

Referring again to FIG. 7, the user may first select the contacts at the main menu 126, and "View All" from the contacts options screen 128. The all contacts screen lists the names of all contacts stored on the handset. In one embodiment of the invention, information icons 142 may appear adjacent a name to indicate the type of numbers stored for that specific contact. In one embodiment, contacts that do not have a voice number will not have adjacent icon, as seen on the all contacts screen 130 for the "Family" contact. The user may place a direct call from either the PTT contacts screen 122 or the all contacts screen 130 by pressing the PTT button. Pressing the PTT button places a direct PTT call to the stored PTT address for the selected contact, as shown in blocks 124 and 132. In the all contacts screen 130, the user may place a cellular call to the contact's primary number, as shown in block 134, by pressing the send key on the handset (not shown).

The user can view the contact information screen 136 for each contact by highlighting the contact and selecting the contact in either the PTT contacts screen 122 or the all contacts screen 130. As shown in FIG. 7, the contact information screen 136 for Jason includes a home phone number and a PTT number. In this screen 136, the user may press PTT to initiate a call 146, return to the preceding screen 148, or select another option 144. If the user scrolls to the home phone number as shown in screen 138, the user may press a send key to initiate a voice call 150, or he may choose another option 154. The user also may press PTT directly 152 or scroll down to the PTT number as shown in screen 140, and press PTT to initiated a PTT call 152.

Continuing with FIG. 7, the option soft key selections 137, 139, 141 available to the user may vary from screen to screen depending on what information is highlighted on the screen. For example, on contact screen 136, the name "Jason" is highlighted such that the options 144 available to the user are to add a new contact, to assign or unassign a ringer for the contact, to erase the contact, to edit the name, or to classify the contact. Other embodiments may include more options or less options. Highlighting the home phone number for Jason on contact screen 138 provides a different set of options 154. In one embodiment, these options may include send text message, view number, add speed dial, edit phone type, erase number, edit number, etc. Highlighting the PTT contact number in contact screen 140, provides the options 156 of erasing the address, editing the address, and viewing the address.

Figure 8:
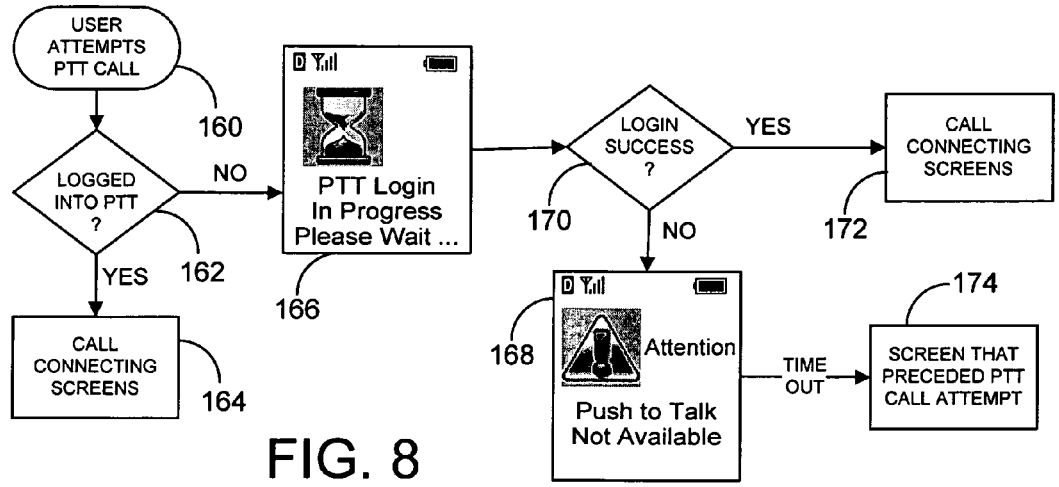
FIG. 8 illustrates a flow diagram of a PTT call login process.

FIG. 8 illustrates a flow diagram of a PTT call login process when a user attempts to place a PTT call 160 and the handset is not registered with a PTT server. If the user is logged into the PTT server 162, then the call connecting screens are displayed 164 as discussed with reference to FIG. 6. If the user is not logged into the PTT server 162, then the handset attempts the PTT login, as shown on screen 166. If the login is successful 170, The call is connected as indicated by the call connecting screens 172. If the PTT login is not successful, then an attention screen 168 informs the user that push to talk is not available, and a preceding screen is re-displayed 174.

Figure 9:
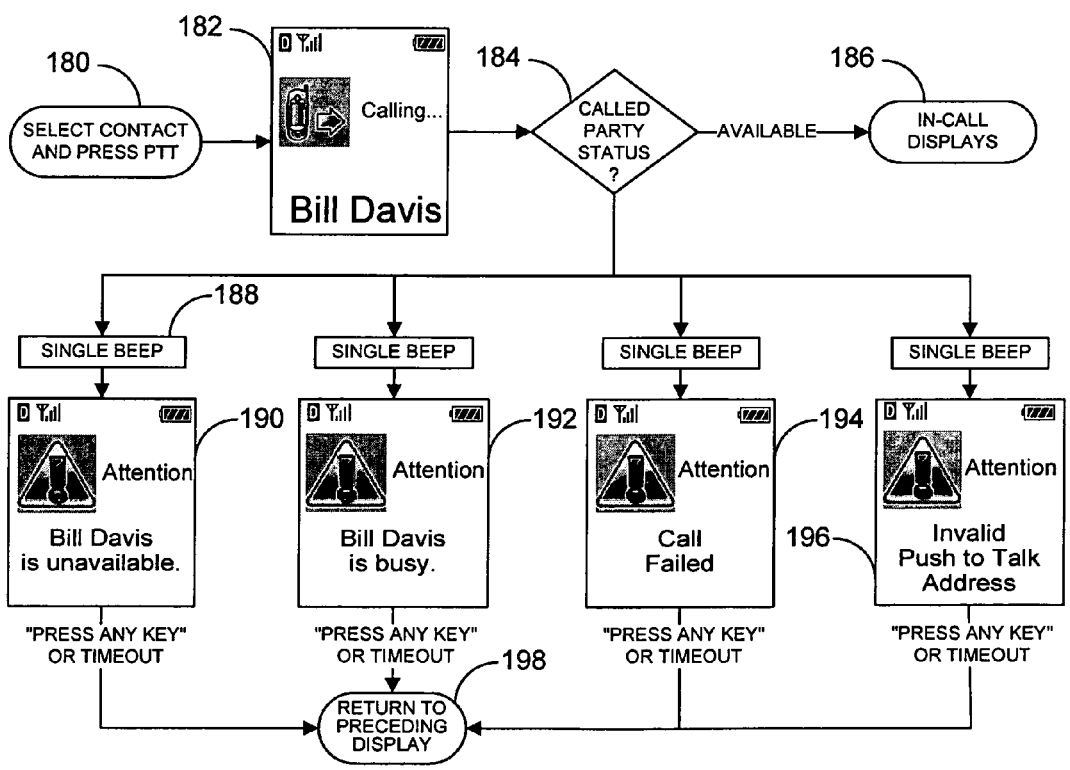
FIG. 9 illustrates connecting screens for a PTT call when a user is not available.

In some cases a user may try to place a PTT call to a user that is not available, as illustrated in FIG. 9. The user selects a contact and presses the PTT button 180. The screen shows the connecting status 182. If the called party is available 184 then the in-call screens are displayed 186. However, if the called party is not available, an attention screen will display one of a variety of statuses including that the party is unavailable 190 or busy 192. Alternately, the status will show that the call failed 194 or that the push to talk address is invalid 196. In one embodiment, an audio cue, e.g., a single beep 188, will accompany the visual cue of the attention screen 190, 192, 194, 196. After a time out, or by pressing any key, the user is returned to a preceding screen 198.

Figure 10:
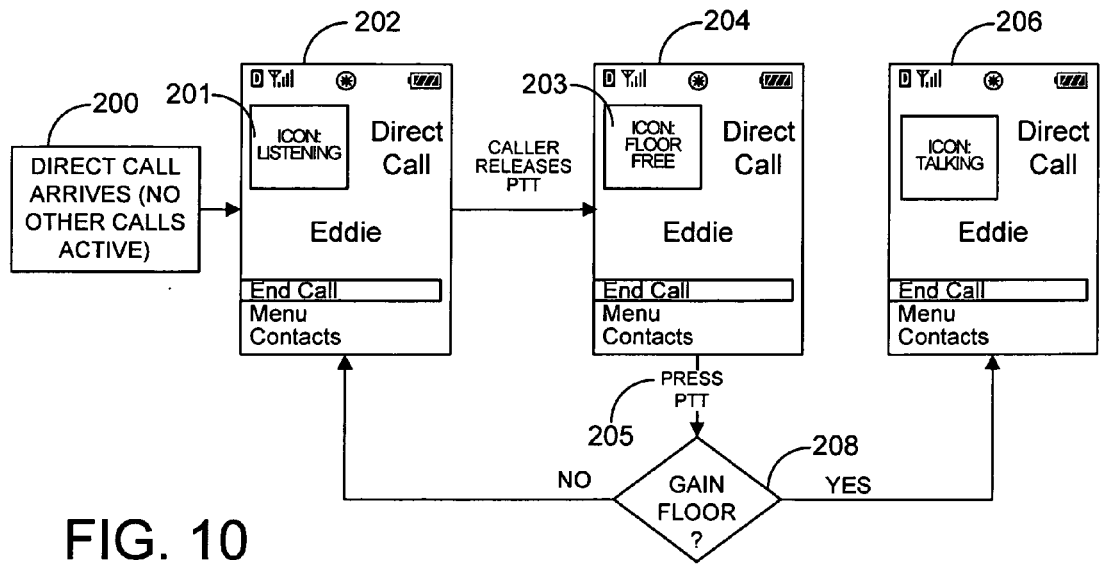
FIG. 10 illustrates a flow diagram of a user receiving a PTT call.

FIG. 10 illustrates a flow diagram of a user receiving a PTT call when no other calls are active 200. When a direct call arrives 202, and no other calls are active, an audio tone sounds followed by the voice of the caller, as indicated by the listening icon 201. The name of the calling party, e.g., "Eddie" is displayed on the direct call screen 202. When the caller releases the PTT button, the floor available tone is sounded and the user is free to respond, as indicated by the floor free icon 203. The user responds by pressing the PTT button 205. The floor is unavailable 208 when another party is first to push his or her PTT button, and the display returns to the listening call screen 202. If the floor is available 208, the call screen 206 indicates that the user is talking to the caller. Note that, in one embodiment of the invention, the in-call screens that are displayed when receiving a direct PTT call are identical to the in-call screens that are used when originating a direct call. In other embodiments of the invention, the in-call screens may show a distinction between receiving and initiating a PTT call.

Figure 11:
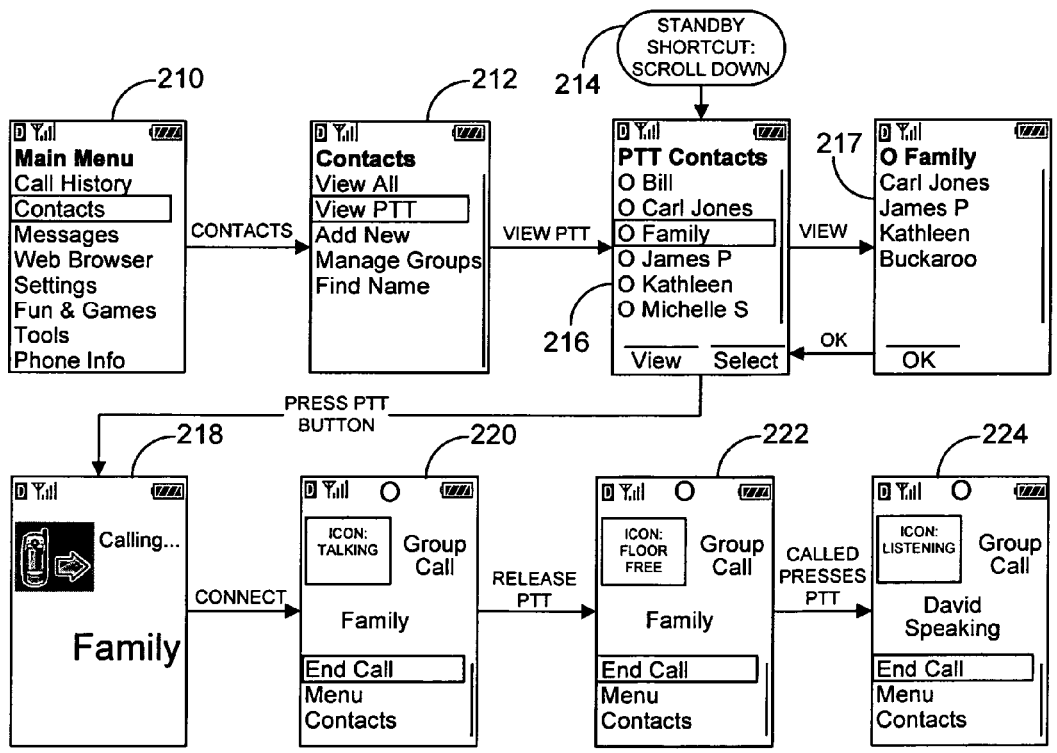
FIG. 11 illustrates a flow diagram of a group call origination from a "View PTT Contacts" List.

The user can also originate group calls by selecting a "stored group" that the user has created with the handset user interface. For example, a user chooses "contacts" from the main menu 210, as shown in FIG. 11. "View PTT" is then selected in the contacts screen 212 to view the PTT contacts screen 216. In other embodiments, the PTT contacts screen 216 can be reached by shortcuts 214. The user scrolls to the desired contact selection, e.g., family. The soft option "View" may be selected to view the names of the people in the "Family" group, as shown in screen 217. Pressing the "OK" soft key returns the user to the PTT contacts screen 216. The user then initiates a group call from the PTT contact screen

216 by pressing the PTT button. The calling screen 128 then displays that the call is in progress. Once the call is connected, the in-call screens 220, 222, 224 display that the user is speaking, the floor is free, or the user is listening. In a group call, the speaker's name is presented to show which group member is speaking. The name is taken from the contact list, if available, or the name is taken from the SIP URL.

If a user selects a group from the contact list 216 and presses the "send" key on the wireless device, this will result in an error screen since it is not possible to place a standard cellular voice call to a PTT group. Also note that the PTT contacts screen 216 provides a left soft option of "view" when a group contact is selected. However, when an individual contact is selected as shown in the PTT contacts screen 122 of FIG. 7, the left soft option displayed is an "alert" option since alerts may be sent to individual contacts as discussed further below.

Figure 12:
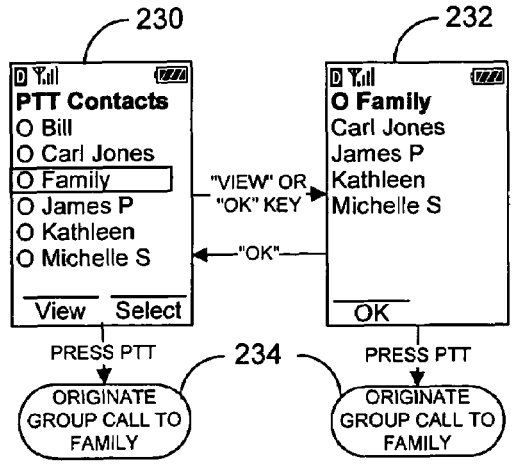
FIG. 12 illustrates screens that are displayed when a user chooses to view and/or edit a group from the PTT contacts list.
Figure 13:
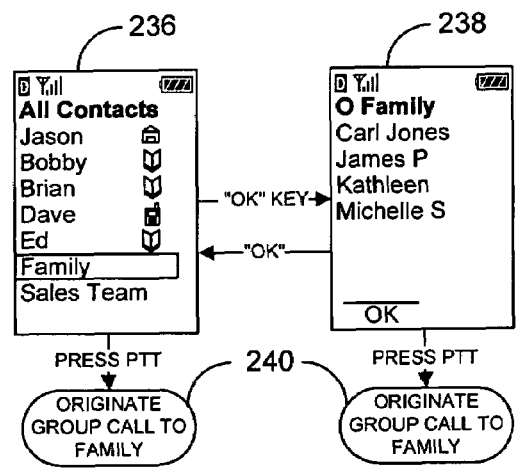
FIG. 13 illustrates screens that are displayed when a user chooses to view and/or edit a group from the all contacts list.

FIGS. 12 and 13 illustrate selection of a group for call origination from the PTT contacts screen 230 or the all contacts screen 236. In either screen 230, 236, the user scrolls down to the desired group. The group members can be viewed by selecting the view soft option on the PTT contacts screen 230, or by pressing an OK key on the handset for either screen 230, 236. The group members are then displayed in a group member screen 232, 238. A PTT call can be originated from all of the screens, that is, from the PTT contacts screen 230, the all contacts screen 236, and the group screens 232, 238 by pressing the PTT button on the handset, as shown in blocks 234 and 240.

Figure 14:
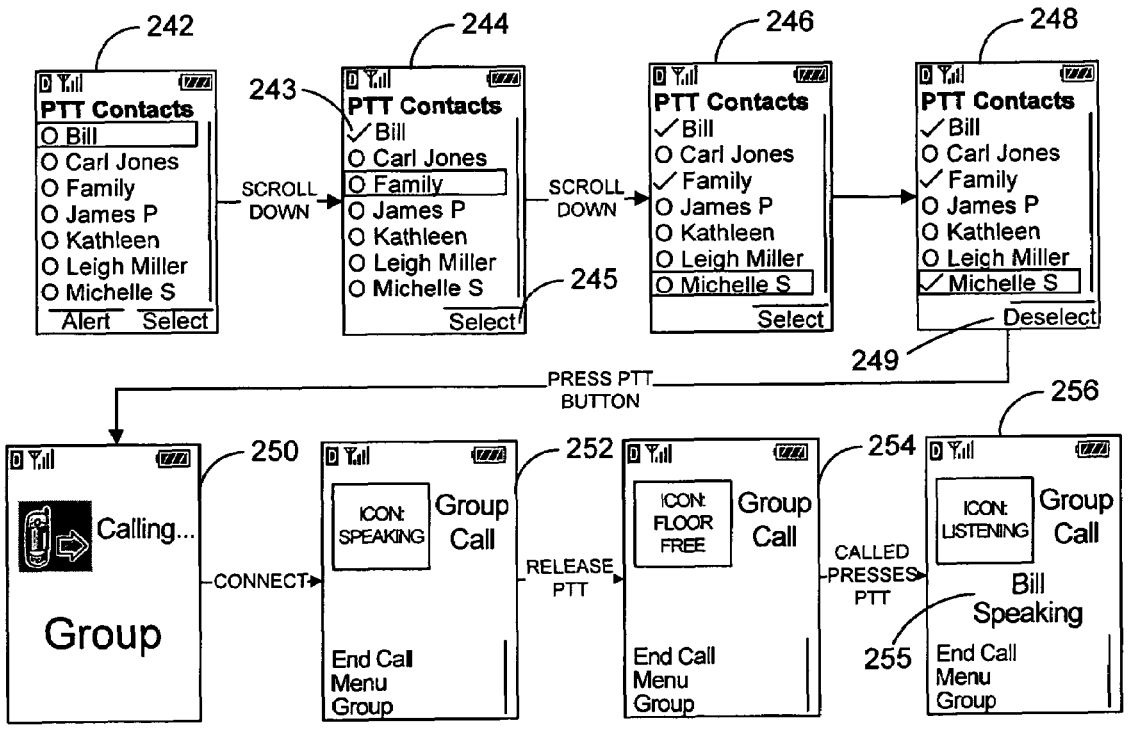
FIG. 14 illustrates a flow diagram of an ad hoc PTT call origination by selecting multiple contacts.

FIG. 14 illustrates a flow diagram of a PTT call origination by selecting multiple contacts from the PTT contacts screen 242. The user can originate group calls by selecting multiple individual and/or selecting multiple ad hoc groups that have been stored in the handset. In the illustrated embodiment, a first contact "Bill" is selected in a first screen 242 using the "select" soft option. Upon selection of the contact, a check mark icon 243 appears next to the selected name, as shown in screen 244, and the right soft key changes from "select" 245 to deselect" 249, as shown in screen 248 for the contact "Michelle S". In screen 244, the "Family" group is selected for the ad hoc group call. When the user has selected at least one contact of a group contact, then the left soft key "Alert" is no longer available in one embodiment in which alerts can only be sent to a single person. In other embodiments where an alert message can be sent to multiple people, the "Alert" soft key remain available for selection.

Continuing with FIG. 14, in screens 246 and 248, the user selects another contact "Michelle S" for the group call. Members can be deselected by scrolling to the selected member and pressing the deselect soft key. The deselect soft key is presented for selection for any contact that has a check mark (or other indication of selection). The user then presses the PTT button to initiate the group call 250. In this case, note that no group name is available to the user on the in-call screens 252, 254 since no group name exists in this scenario. However, in group call screen 256, the screen shows the person in the add hoc group who has the floor 255.

One embodiment of the invention supports a simple functionality for placing a "closed group" call for groups that have been stored on the phone. To store a closed group on the phone, the user stores the groups valid SIP URL using the add new screen discussed below. The user initiates the call to the closed group, by highlighting the name in the PTT contacts list, and pressing the PTT button, similar to placing a call to any other PTT contact. If the SIP URL domain name begins with the text "group", then the closed group contact will show up with a "PTT Group" icon in the PTT Contacts list and the All Contacts list, rather than with a "PTT Individual" icon.

Figure 15:
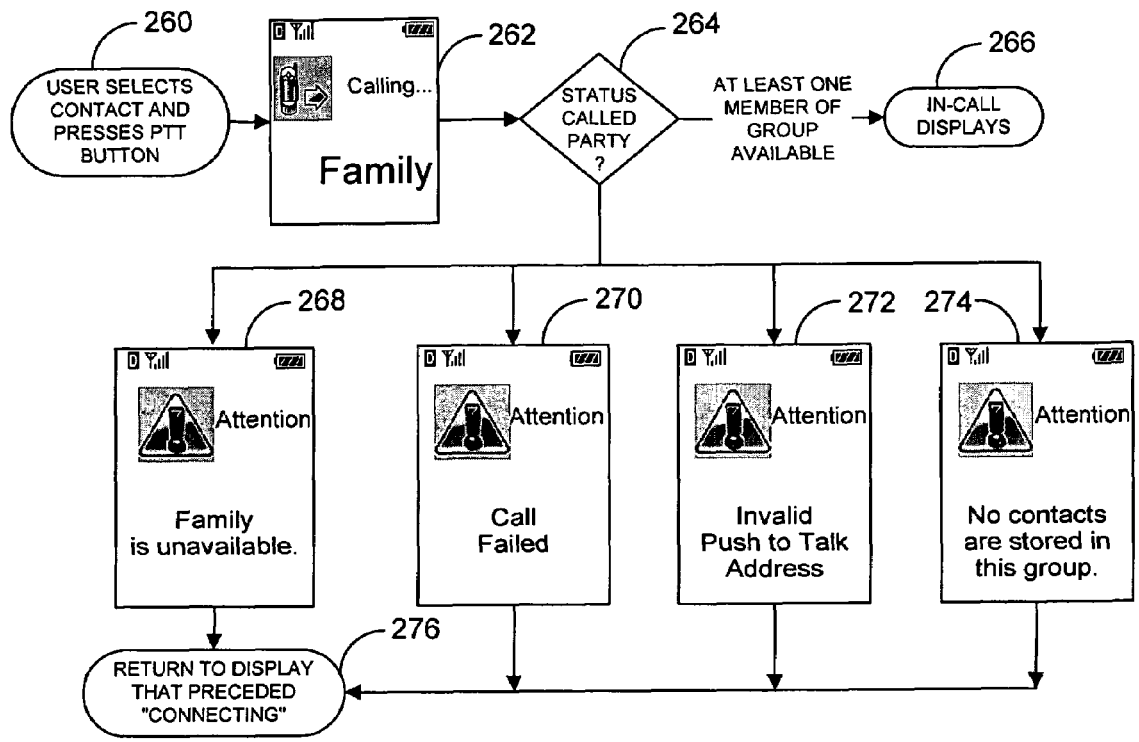
FIG. 15 illustrates a flow diagram of a PTT call origination outcomes for a group PTT call.

FIG. 15 illustrates a flow diagram of a PTT call origination outcomes for a group PTT call. In some instances, a user may initiate a call to a group 260, 262 that is not available. If at least one member of the group is available 264, a connection is made, and the in-call screens are displayed 266. If all members are unavailable, the attention screen 268 indicates the status of "unavailable". Other statuses include call failed 270, invalid push to talk address 272 if any of the numbers are invalid, and a message that the group has no stored contacts 274. Upon a time out or pressing of any key, the attention screen 268, 270, 272, 274 returns to the preceding display screen, as shown in block 276.

Figure 16:
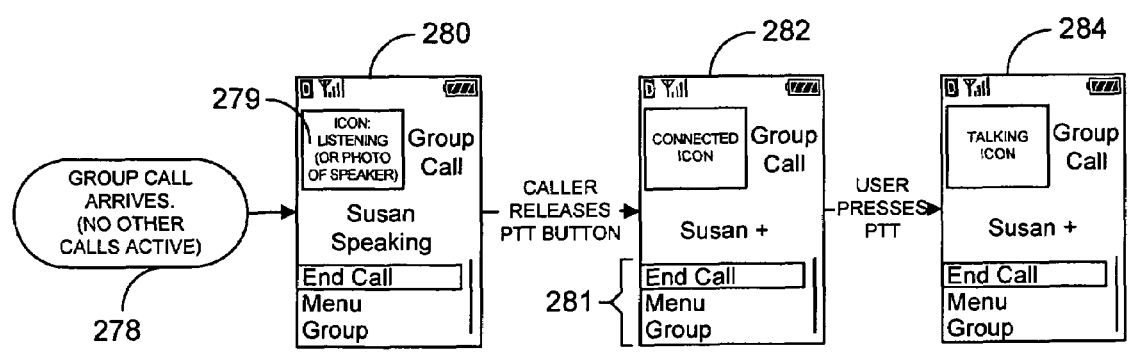
FIG. 16 illustrates a flow diagram of receiving a group PTT call when no other calls are active.

FIG. 16 illustrates a flow diagram of receiving a group PTT call that is initiated by someone else in a group 278 when no other calls are active. In group call screen 280, the user receives a call from Susan, who initially has the floor as indicated in the listening icon 279. In some embodiments of the invention, the listening icon 279 will display a photo of the speaker, if available. In this example, the group name is not known. Thus, once the caller releases her PTT button, the group call screen 282, 284 shows the name of the call originator with the designation "+". The name for the originator is the contact name if a match exists in the contact list. Otherwise, the name appears as the "name" portion of the PTT SIP URL of the originator.

Continuing with FIG. 16, when a PTT direct call is successfully connected in a preferred embodiment of the invention, the user may select soft keys that are available from the "In-Call Standby" screen 282. The soft keys 281 include "End Call" which is analogous to "hanging up" on a regular voice call, "Menu" which takes the user to the main menu of the handset, and "Group" and "Contacts" (not shown) which takes the user to the "Manage Group" or "PTT Contacts" screen. Using the Menu soft key, the user can review the main menu and make selections during an active PTT call, e.g., to review information that is stored in the handset. Using the Group soft key allows the user to see the members who are in the current group call. The Contacts soft key takes the user to the PTT contacts screen to "add new members" to an active PTT call.

Figure 17:
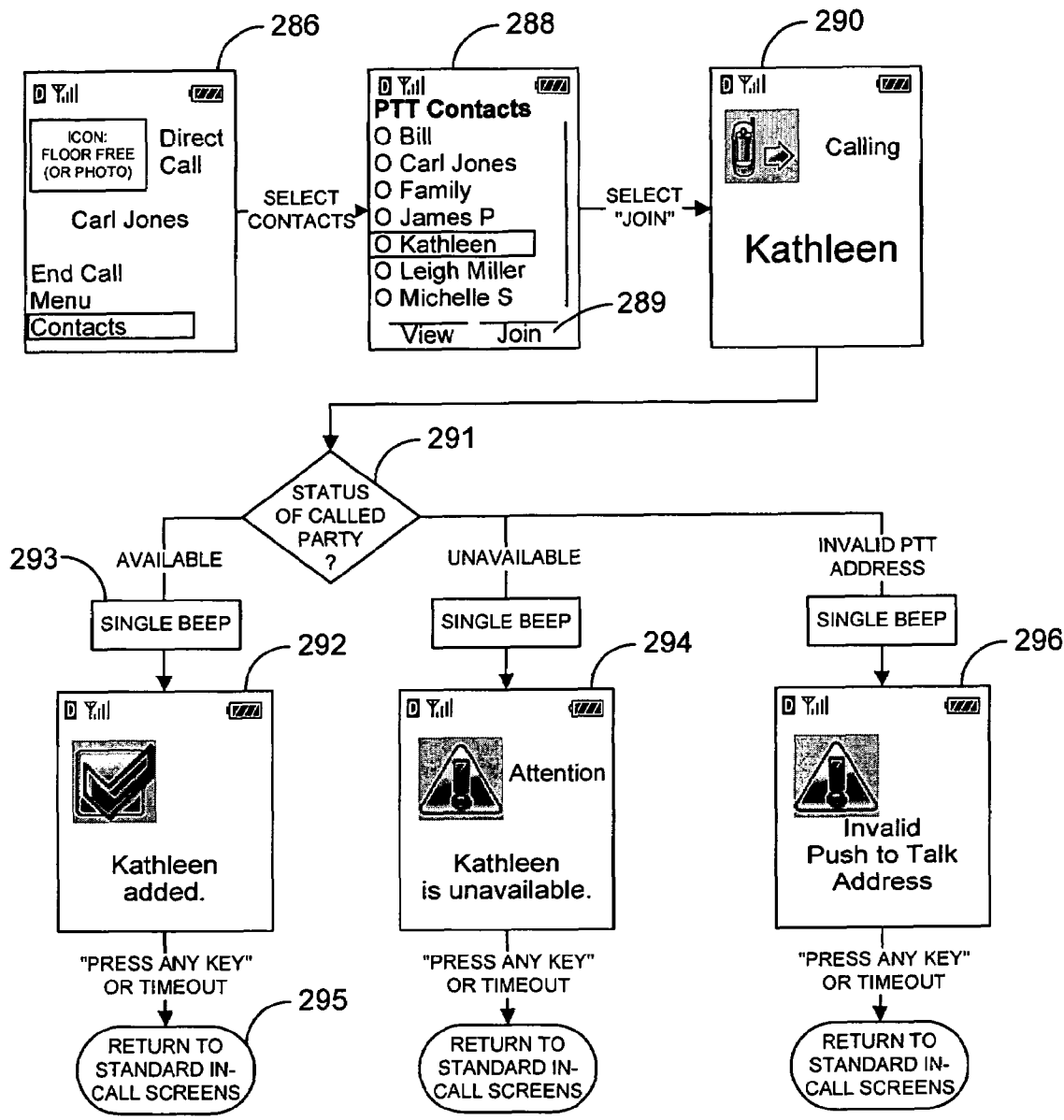
FIG. 17 illustrates a flow diagram of adding a new member to an active PTT direct call from a viewpoint of the person adding the new number.

FIG. 17 illustrates a flow diagram of adding a new member to an active PTT direct call from a viewpoint of the person adding the new number. During a direct group call 286, the user selects the soft key "Contacts" to view the PTT contacts lists screen 288. A contact "Kathleen" is selected to join the group by selecting the "Join" soft key 289. The calling screen 290 is displayed to show that the contact is being called. The user status is determined 291, and the screens display either that the contact is added to the call 292, the contact is unavailable 294, or the push to talk address is invalid 296. As discussed with previous examples, an audio tone 293 may be sounded in conjunction with displaying the user status. After a time out or pressing any key, a preceding screen is displayed 295.

Figure 18:
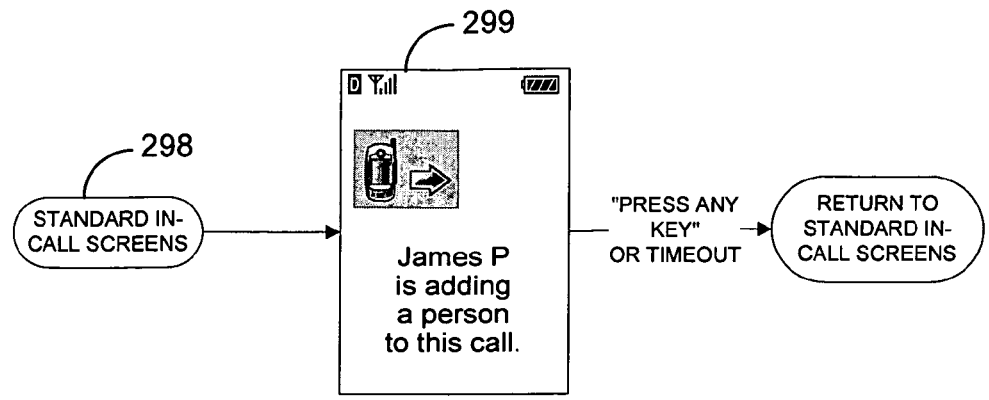
FIG. 18 illustrates the screen that is viewed by participants in a direct call when another participant adds a member to the call.

FIG. 18 illustrates how participants in a "direct call" receives notification when another participant is adding a new member to the call. When a user is engaged in a direct call, the standard in call screens are displayed 298. When another participant in the call adds a contact to the call, the screen 299 indicates that the other party, in this example "James P" is adding a person to the call. The user then is aware of all parties to the conversation. In one embodiment of the invention, the user experience for a target being added to an active PTT call is identical to the user experience for receiving a new call. When the target is joined to the call, the floor will either be taken or will be free, as indicated by the standard in-call screens. There will be no unique feedback to the target. In other words, there are no special screens or text to denote that the target is being added to an existing call instead of a new call.

Figure 19:
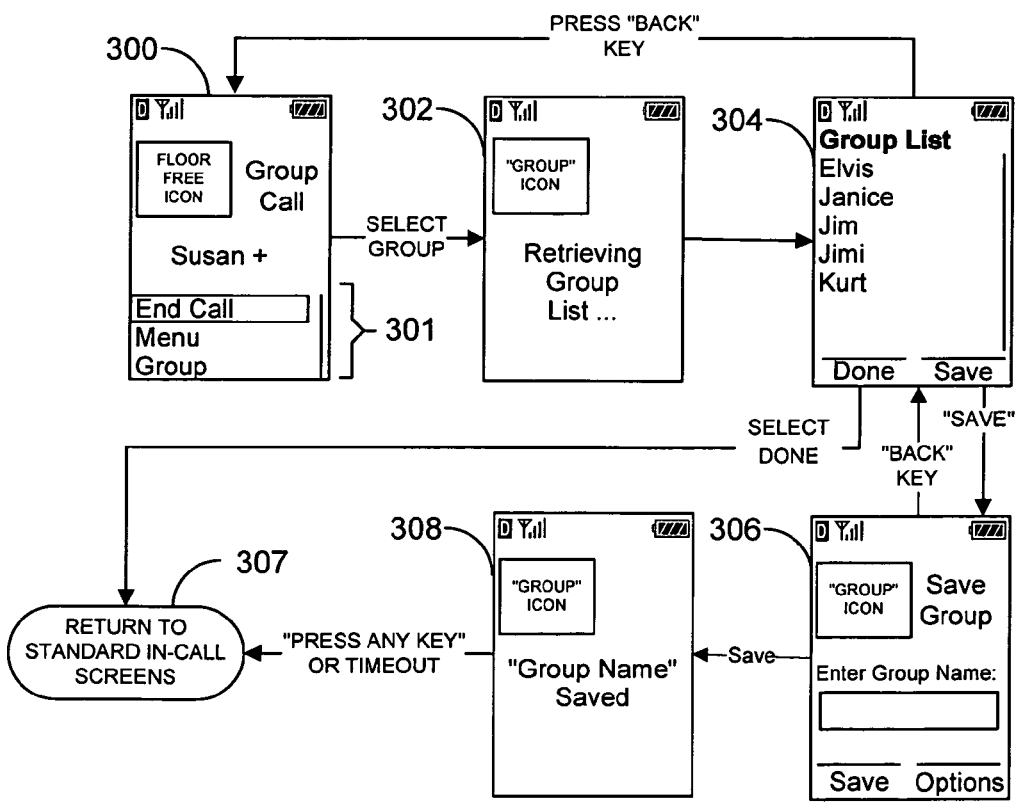
FIG. 19 illustrates a flow diagram of a user selecting to save the contacts for the participants in a current group call.

FIG. 19 illustrates a flow diagram of a user selecting to save the contacts for the participants in a current group call. When a PTT group call is successfully connected 300, the user has soft keys 301 that are available from the screen 300 to view and save group information. The soft keys 301 for the illustrated example include "End Call", "Menu", and "Group". Selection of the group soft key retrieves the group list for the members who are on the current group call 302, 304. The group list provides soft key options of "Done" and "Save". Selection of the done soft key returns the user to the standard in call screen 307. The user has the option to select the save soft key and enter a group name as shown in the save group screen 306. Once the group is saved by selection of the "Save" soft key option in the save group screen 306, a screen 308 confirms the action of saving the new group on the user handset with all of the members who were invited to the current group call.

Upon arrival of a new PTT call, when no other calls are active, the PTT in-call screens will take precedence in one embodiment of the invention. For example, the in-call screens of the arriving call will take precedence over handset standby, the "add contact" screen, the "main menu", or whatever screen the user was viewing. After the PTT call is ended and the call ended screen is presented, the user will be returned to the screen that preceded the PTT call, e.g., handset standby, the "add contact" screen, etc. Note that, in both a "Direct" call and a "Group" call, the user has the option of selecting "Menu", "Contacts", or "Group" during a PTT call. When this occurs, the user's manual selection of menus and screens takes precedence over the standard PTT in-call screens for the existing call, i.e., takes precedence over the "speaking", "listening", "floor free", "call ended" and any other standard. PTT in-call screens. In order for the user to access the in-call screens again, the user simply backtracks by pressing the "back" key until returning to the "in-call" screens. PTT audio continues as normal while the user views any other screens. Also, the PTT button continues to be functional as a "floor request", even when the user is viewing a screen other than the standard PTT in-call screens. For example, the user can request the floor and successfully gain the floor, even when reviewing the contact list screen or a call history screen.

Figure 20:
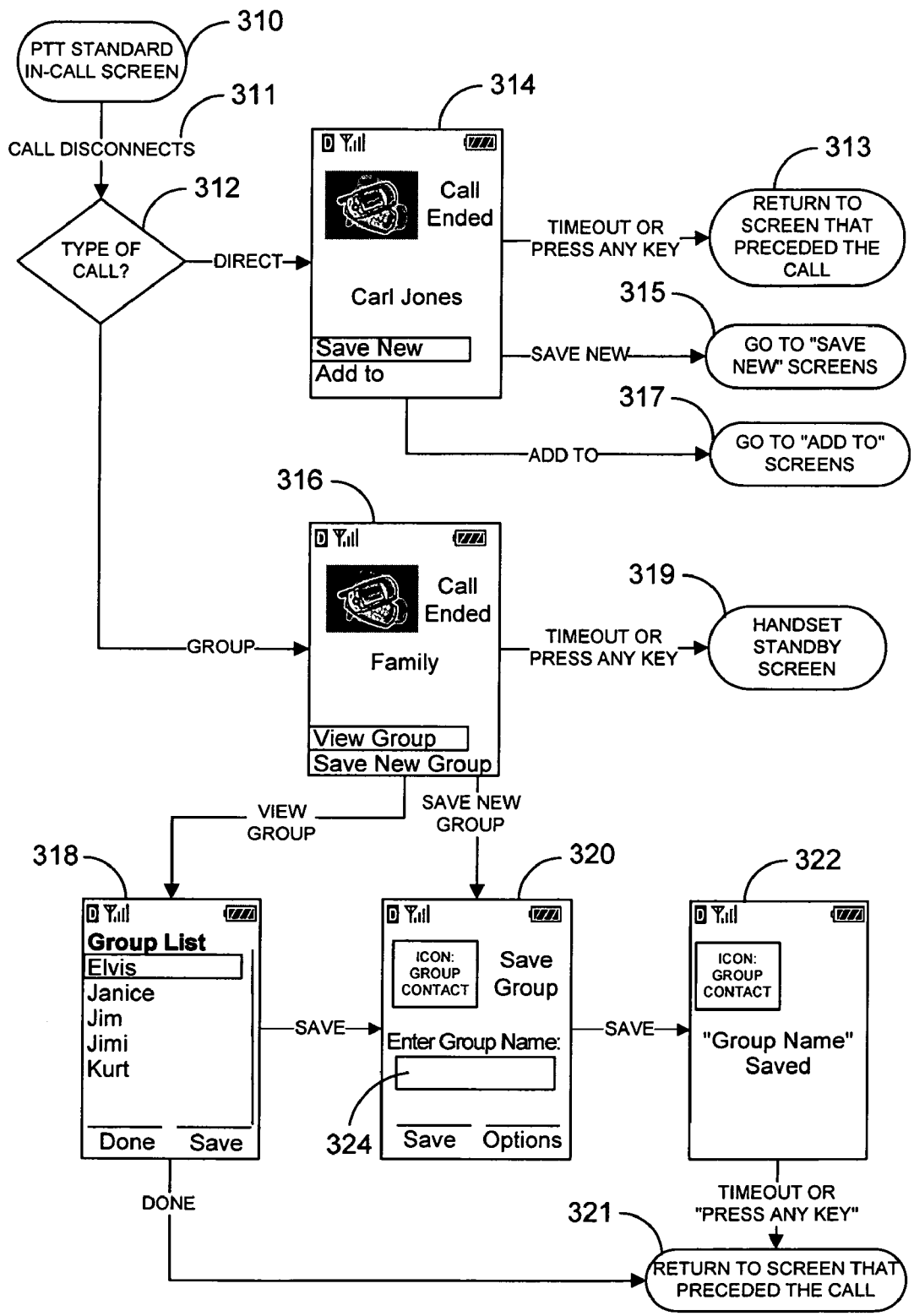
FIG. 20 illustrates a flow diagram of ways in which a PTT call can be disconnected.

FIG. 20 illustrates a flow diagram of ways in which a PTT call can be disconnected. There are multiple ways that the call can be disconnected during a PTT standard call 310, including when a user presses the "end" key, when the user selects the "end call" soft option, and when a "No Speaker" timeout occurs. After a call disconnects, the type of call is determined 312. If the call was a direct call, a call ended screen 314 is displayed. The user can choose soft key options to save the information of the calling party 315, or can add to the existing information about the calling party 317. Otherwise, the display returns to a preceding screen 313. For a group call, a call ended screen 316 is displayed with group soft key options which include view group and save new group. Selecting the view group option calls up the group list screen 318. Selecting the save new group soft key option calls up the save group screen 320. In this screen 320, a group name can be added in a provided field 324, and the group is saved by selecting the save soft option. A screen 322 is presented to confirm the action. The display then returns to a preceding screen 321. Sometimes is possible for all of the other parties on a PTT call to disconnect, and for the user to be the only person on the call. When this occurs, any attempt by the user to "gain the floor" is considered a failed attempt, and the user is alerted that no one else is connected.

Figure 21:
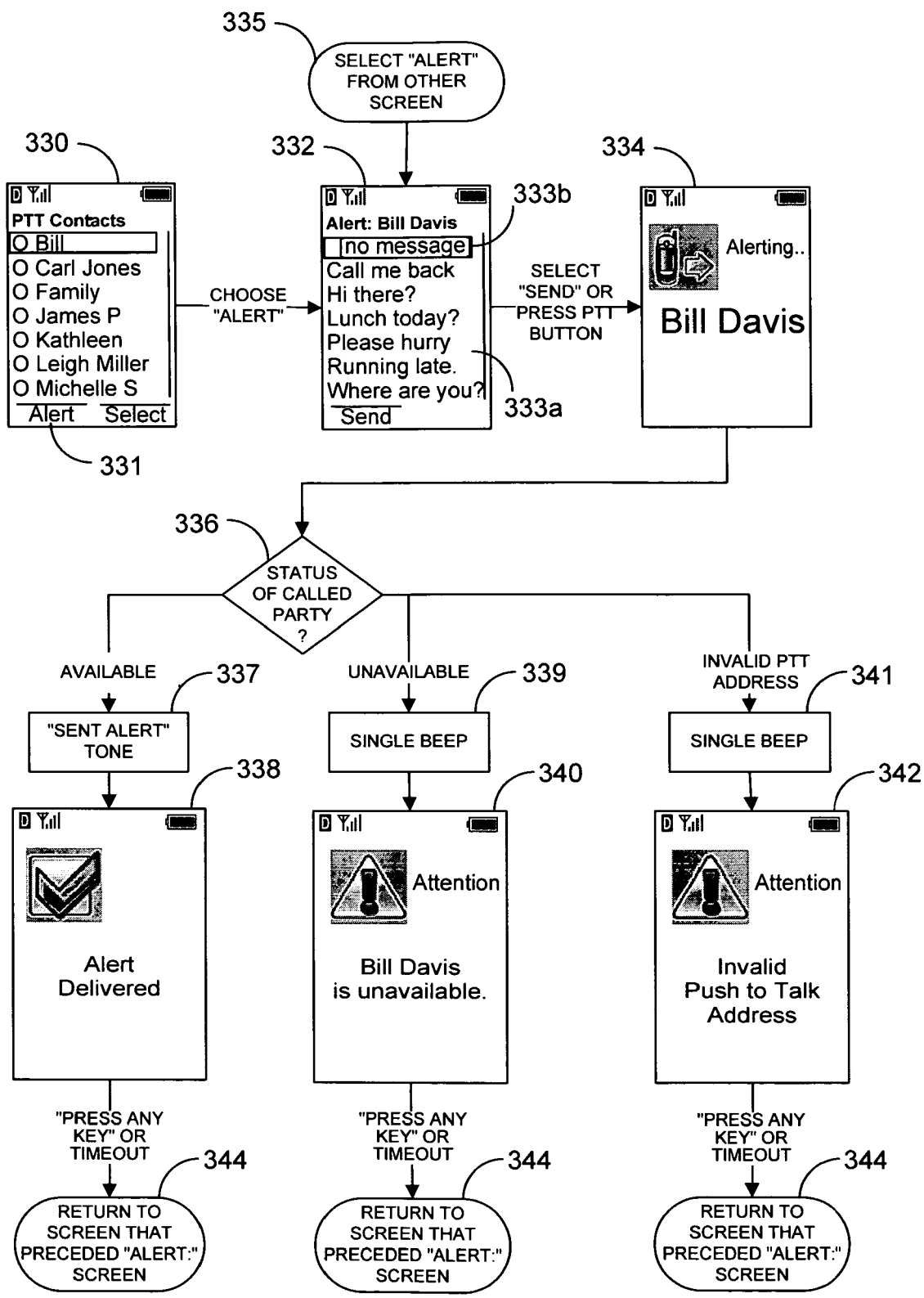
FIG. 21 illustrates a flow diagram of a the steps for sending an alert to another PTT user.

A user of the PTT capable phone of an embodiment of the invention can send an alert text message to another PTT user. FIG. 21 illustrates the basic steps in sending an alert message. As shown in block 330, the user scrolls down to the desired recipient, Bill D., and chooses the "Alert" option 331 on the display. An alert message screen 332 then displays a prestored list of alert messages 333a. In other embodiments, the user may proceed directly to the alert message screen 332 from an other screen that includes an alert selection 331. In one embodiment, the specific "alert texts" for the alerts are stored on and determined by the network server. A carrier can specify what messages should be supported by providing that information as a "server requirement", rather than as a handset requirement. In another embodiment, the specific alerts may be user defined, or user chosen. For example, the user may compose short texts to be stored on the phone or on the server, of the user may select a limited number of text messages from a provided list. Continuing with FIG. 21, the user also has the option of choosing a no text message 333b. This option sends an alert to the intended recipient without a message as discussed below with reference to FIG. 22.

Once the user selects the desired text message 333a or no message 333b, a calling screen 334 is displayed while the wireless communication system determines the status of the recipient, that is, the called party, as shown in decision block 336. If the recipient is available, an "Alert Delivered" screen 338 is displayed. Optionally, a tone 337 indicating that the alert was successfully sent may be sounded by the wireless device. In step 344, the display then returns to a screen that preceded the alert screen 332 after a timeout or after another key is pressed. In this example of FIG. 21, the display returns to the PTT contacts screen 330. If the recipient is unavailable, a "Recipient is Unavailable" screen 340 is displayed in conjunction with an optional tone 339, such as a single beep, to confirm the unavailability. Similarly, if the recipient PTT address is invalid, an "Invalid" screen 342 is displayed in conjunction with the optional single beep tome 341.

Figure 22:
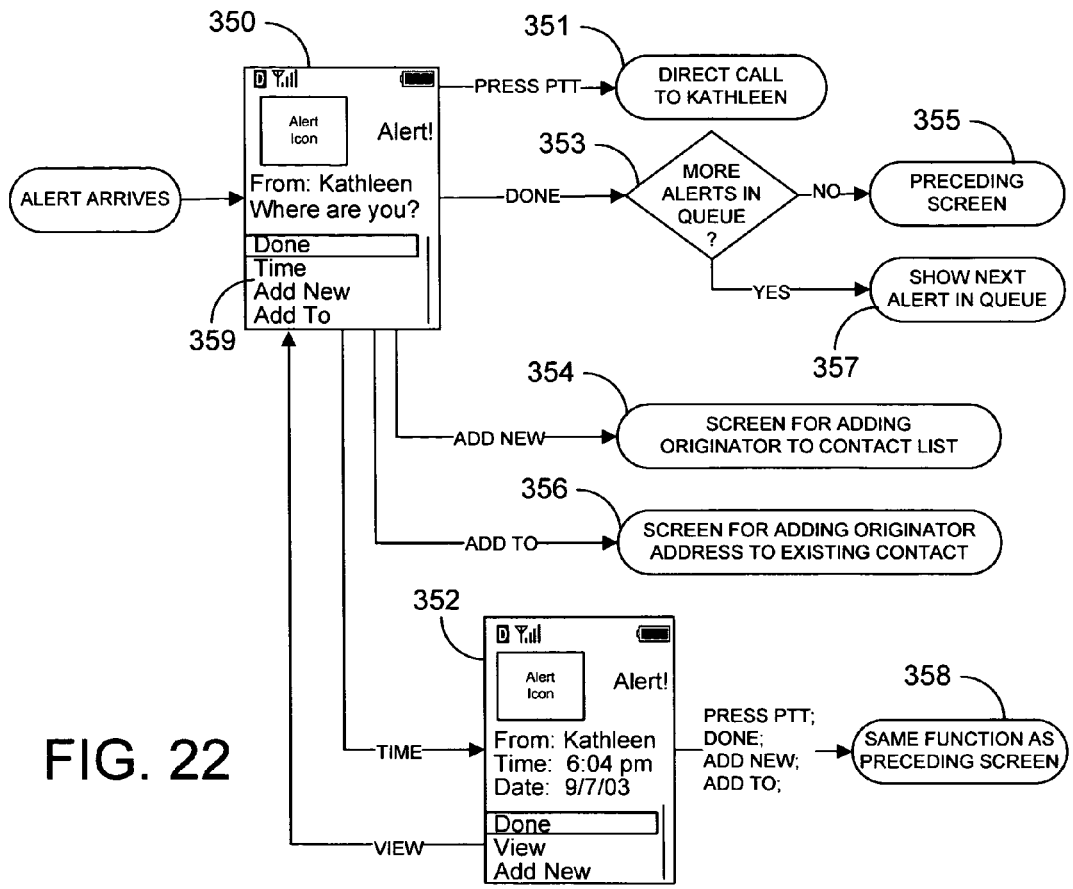
FIG. 22 illustrates a flow diagram of receiving an alert from another PTT user.

FIG. 22 illustrates a flow diagram of a user receiving an alert. When the receiving party receives an alert, a receive alert screen 350 is displayed in conjunction with an optional audio "Alert Arrived" tone. The receive alert screen 350 displays a sent text message line, e.g., "Where are you?", and the name of the sending party, e.g., "Kathleen". If the alert is sent without a text message, then the test message line is blank. The receiving party has a number of options 359 including "Done", "Time", "Add New" and "Add to". Other embodiments may include more options or less options. The receiving party may also press the PTT button to originate a PTT direct call to the sender, that is, to Kathleen, as shown in block 351.

Continuing with FIG. 22, if the "Done" option is selected, and there are no more alerts in the queue 353, then the screen preceding the alert screen is displayed 355. If more alerts are in the queue 353, the next alert is displayed 357. Selection of the "Add New" option results in a screen for adding the calling party to the contact list 354. Selecting the "Add To" option allows the user to add address information to an existing contact 356. The "Time" option provokes a time and date display 352 for the alert message. In one embodiment, If the user places a call from the Alert screen, then upon completion of the call, the user is brought back to the queue of PTT Alerts 353. When all alerts have been dismissed or acted upon, then the user will return to a handset standby screen or to the screen that was displayed before the arrival of the alert, as shown in block 358.

The Alert function of an embodiment of the invention as described above is a quick and easy method of sending simple text messages between push to talk users. An additional way to communicate with text messaging is by sending and receiving short message service (SMS) messages. Referring to FIG. 7, To send an SMS message, the user must access a contact detail screen, highlight a voice phone number, and select "Options". An available option is "Send Text Msg". After selecting "Send Text Msg", the standard user interface is used to compose and send the text message. During an active PTT call or voice call, if an SMS message arrives, then a screen for receiving the SMS message will be displayed. Similarly, if a voicemail notification message arrives, the screen for receiving voicemail notifications will be displayed.

Figure 23:
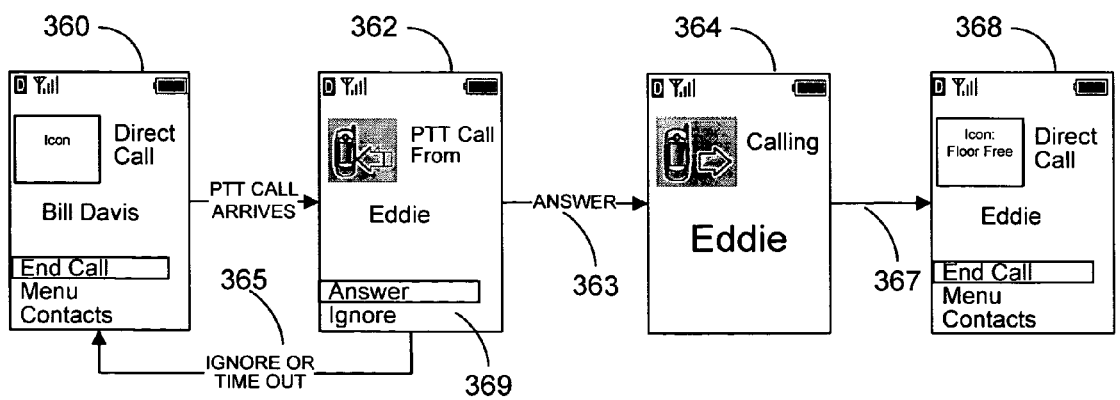
FIG. 23 illustrates a flow diagram of receiving a PTT call when a PTT call is active.

FIG. 23 illustrates a flow diagram of receiving a PTT call when a PTT call is active. In block 360, a user is engaged in a direct call. If a new PTT call arrives at the handset while the user is engaged in a PTT conversation 360, then the user is presented with a PTT call screen 362 which shows the calling party's name. In one embodiment, an audio signal also announces the new call. The user is presented with options 369 to answer or to ignore the new incoming call. If the user chooses the ignore option, or if a timeout expires 365, then the screen returns to the original PTT call 360. If the user selects the answer option 363, then a PTT call is placed to the originator of the new call, and the original call is disconnected. It is also possible to receive a group call while on a PTT call. In this case, when the user selects "Answer", the user will "join" the group call.

Figure 24:
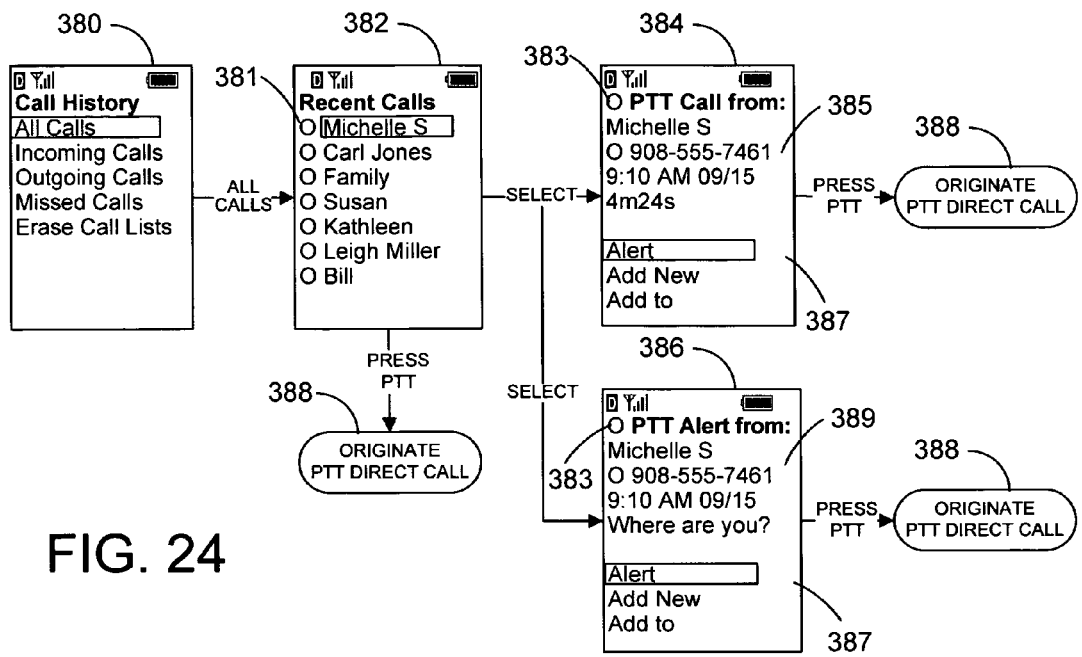
FIG. 24 illustrates a flow diagram of a user accessing a call history list to initiate a direct PTT call or to view a recent PTT alert.

FIG. 24 illustrates the call history screen 380 which is accessed from a main menu. By selecting the "All Calls" option, a "Recent Calls" screen presents a single call history list 382 which integrates both PTT calls and standard cellular voice calls. In one embodiment, the call history menu 380 includes the selections of all calls, incoming calls, outgoing calls, missed calls, and erase call lists. Other embodiments may include additional call history selections. Under each of the five selections, the user can find all relevant PTT calls, as well as all relevant standard cellular calls. Selection of the "All Calls" list of the call history screen 380 presents a recent calls screen 382 showing all of the handset's call history including incoming, outgoing, and missed calls. Both PTT calls and standard cellular calls are included in this list which are identified by unique icons 381. Note however that the illustrated example does not show these distinctions in the icons 381. In one embodiment, the unique icons 381 also identify whether the call was incoming, outgoing or missed. The list also includes both direct PTT calls and group PTT calls.

Upon selection of a name from the Recent Calls list 382, the information regarding the call is shown in a detailed information screen 384, 386. A detailed information screen 384 identifies information 385 about the call. For example, in one embodiment of the invention, the first line identifies a category of the call with a label such as "PTT Call From", "PTT Call to", "Group Call From", and "Group Call To". The second and third lines present information about the other party or parties of the call. For "Incoming Calls" and "Missed Calls", the information on line two is the name of the originator of the call if the Session Initiation Protocol (SIP) Uniform Resource Locator (URL) is a match in the PTT contacts list. The information on line three is the name portion of the SIP URL of the originator. For "Outgoing Calls", the information on line two is the word "Group" for group calls. Or, for direct calls the name of the recipient is presented, if the recipient's SIP URL is a match in the PTT contact list. For group calls, line three is blank. For direct calls, the name portion of the SIP URL is presented.

Block 384 illustrates a detailed information screen for a received PTT Call. PTT calls also are identified by a PTT-specific icon 383 presented next to the name to represent whether the call was "direct incoming", "direct outgoing", "direct missed", "group incoming", "group outgoing", or "group missed". For calls that are standard cellular calls, a cellular-call specific icon (not shown) is presented next to the name or number to represent whether the call was "incoming", "outgoing", or "missed". PTT alerts are also stored in the call history lists, e.g., in the "all calls" list and in the "incoming calls" list. FIG. 24 illustrates an alternate detailed information screen 386 for the situation in which the call from "Michelle S" is a PTT alert call. The detailed information 389 includes the alert message, if any. If an alert was sent without a text message, then the line is blank. In one embodiment, the icon 383 for a PTT alert is identical to the icon for a PTT incoming call.

Continuing with FIG. 24, the detailed information screens 384, 386 also include action options 387. In one embodiment, these options include an "alert" option, an "add new" option, and an "add to" option. If the user selects the alert option, then an alert is placed as described with reference to FIG. 21. Selection of the "add new" option allows the user to store the callers information in the contact list. The "add to" option allows the user to store additional information about the contacting party. These options present a fast and efficient way for the user to store information from a received call. A user can press the PTT button at any time in the recent calls screen 382 or the detailed information screen 384, 386 to originate a PTT direct call to the party displayed on the particular screen.

The call history screen 380 shown in FIG. 24, also includes the "incoming calls" selection. The incoming calls list (not shown) presents all of the handset's recent incoming calls. Both PTT calls and standard cellular calls are included in this list. Similarly, PTT direct calls and PTT group calls are shown in the list. The "outgoing calls" selection of the call history screen 380 presents all of the handset's recent outgoing calls, ant the "missed calls" selection presents all of the recent missed calls. The user can also select "erase call lists" to erase the PTT and the standard voice calls of one or more lists.

Figure 25:
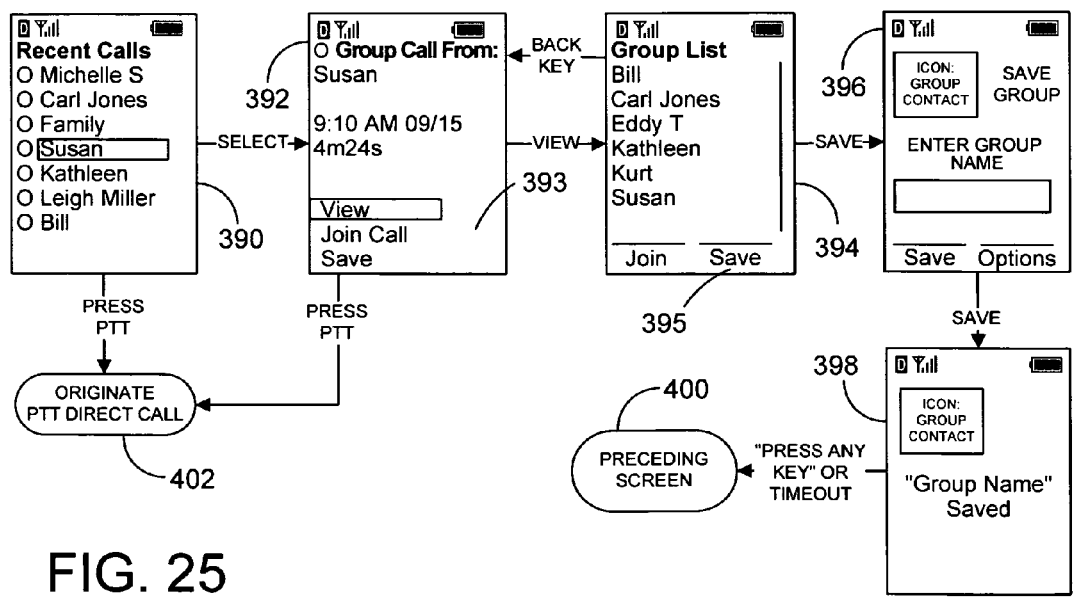
FIG. 25 illustrates a flow diagram of a user accessing a call history list to access contacts of a received group PTT call.

FIG. 25 illustrates a flow diagram of a user accessing a call history list to review and save contacts of a received group PTT call. In the recent calls screen 390 a name is selected by scrolling up or down through the names using appropriate wireless device control keys. In the illustrated example, "Susan" is selected. By pressing the PTT button, a PTT direct call is originated to Susan, as shown in block 402. In the alternative, if "Susan" is selected, a detailed information screen 392 is shown. PTT group calls are indicated by the group name, the originator with a plus symbol, or as a "group". From the detailed information screen 392, a user can press PTT to originate a direct PTT call to the party shown on the screen. In the illustrated example, the call from Susan was a group call. Soft key options 393 include view, join call, and save. Selecting the view option results in a group list screen 394 which lists all of the participants in the group call. The user then has the screen options 395 to save the group or to join the group call. Selection of the save option 395 results in a "save group" screen 396. The user then can enter a name for the group and select the "save" option. The action screen 398 then indicates that the group was saved. A time out or pressing any key will bring the user back to a preceding screen 400. Selecting the join option 395 on the group list screen 394, initiates a PTT call to a group to attempt to join the call, as discussed with reference to FIG. 26.

Figure 26:
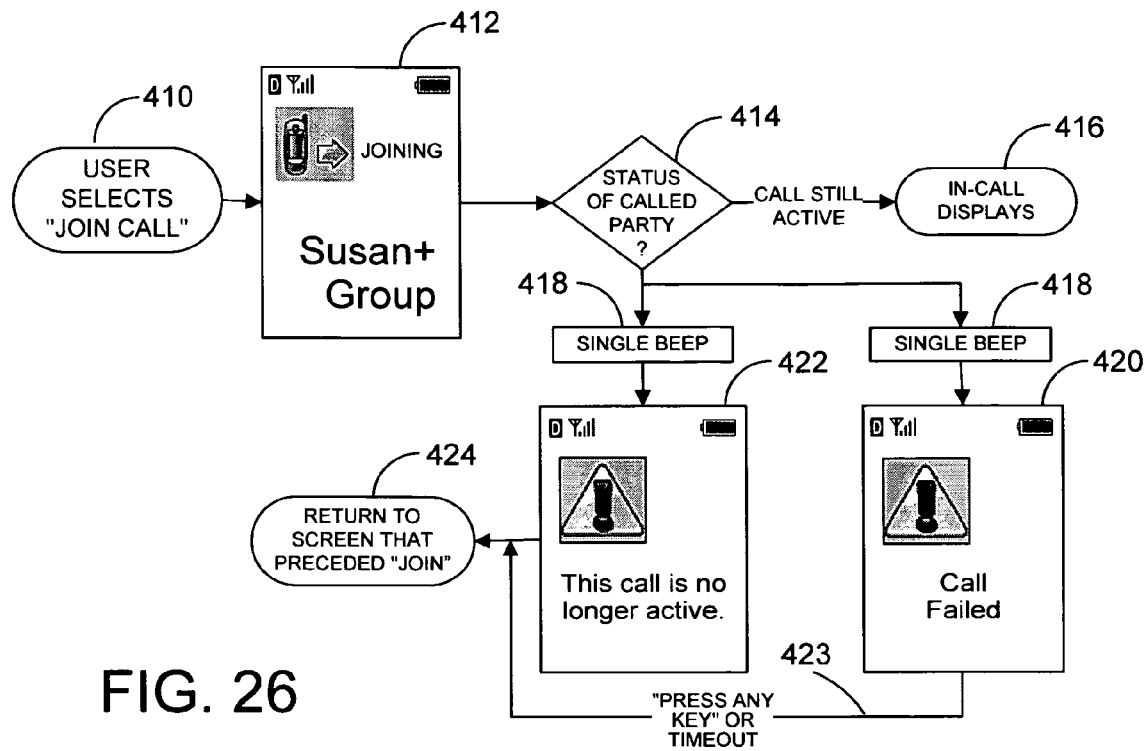
FIG. 26 illustrates a flow diagram of a user selecting to join a group PTT call.

FIG. 26 illustrates a flow diagram of a user selecting to join a group PTT call, as shown in block 410. An call screen 412 indicates the attempt to join the group in a PTT group call. The status of the group is determined in decision block 414. If the call is still active, then the in-call screens are displayed 416, and the user may participate in the PTT group call. In one embodiment, a late joiner to the call does not gain the floor upon being connected. A call that is no longer active is illustrated in a status screen 422 with an option audio tone 418 to indicate the inactive status of the call. Other possible outcomes of the status decision 414 include a call failed screen 420 in such cases, for example, where the originator can not access the network or server. Pressing a key or a time out 423 brings the display to a preceding screen, as illustrated in block 424.

Figure 27:
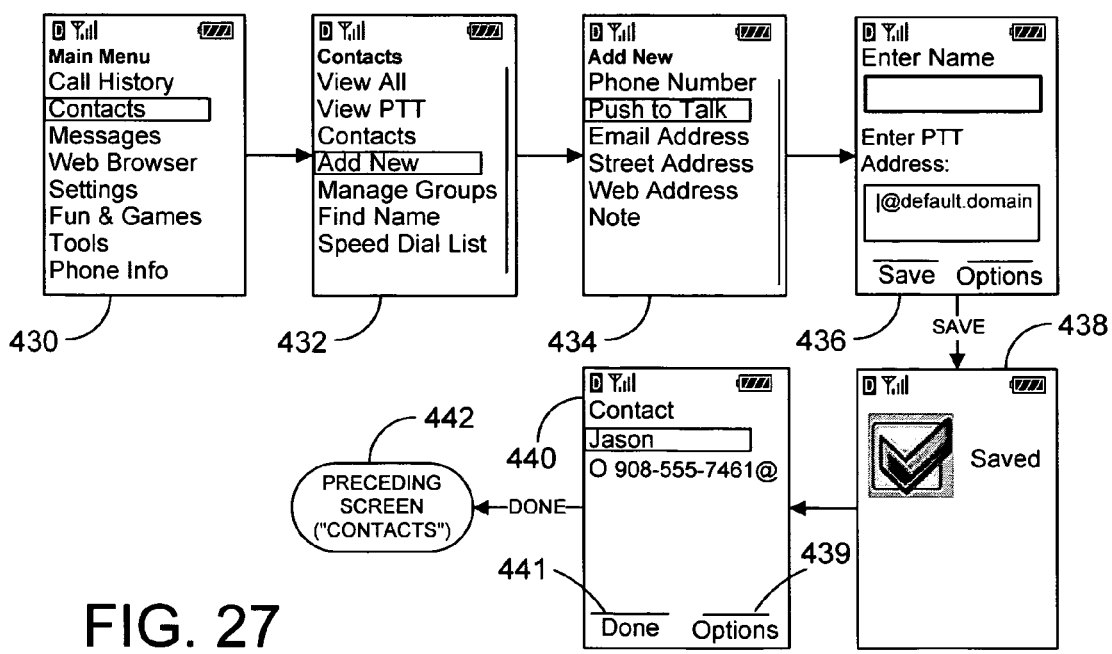
FIG. 27 illustrates a flow diagram of adding a PTT contact to the database of the wireless communication device.

FIG. 27 illustrates a flow diagram of adding a PTT contact to the database of the wireless communication device. From the main menu screen 430, the user can select "contacts" to bring up the contacts screen 432 on the display of the wireless communications device. The contact screen 432 presents the user the option of "add new". By scrolling to this option and selecting the option, the user can then view the add new screen 434. The add new screen 434 of one embodiment of the invention includes the options of adding a new phone number, adding a new push to talk number, adding an e-mail address, etc. If the add new push to talk option is selected on the add new screen 434, an enter name screen 436 is then displayed. The user enters a name in the provided name field, then enters the PTT address in the provided address field 435. In one embodiment, the default domain is pre-populated in the address field 435. After entering the information, the user can select a save option. The display confirms the saved status, as shown in block 438. Selection of any key or a time out brings up the contact screen 440 of the added contact so that the user can confirm the newly added information. The done option 441 returns the user to the preceding screen 442. The "options" option 439 allows the user to perform a number of actions as discussed with reference to FIG. 7. Access to the add new screen 434 of this example is from the contacts menu 432, however, the add new screen 434 may also be accessed from the "recent call" lists and any other screens where the "add new" or "add to" option is presented.

Figure 28:
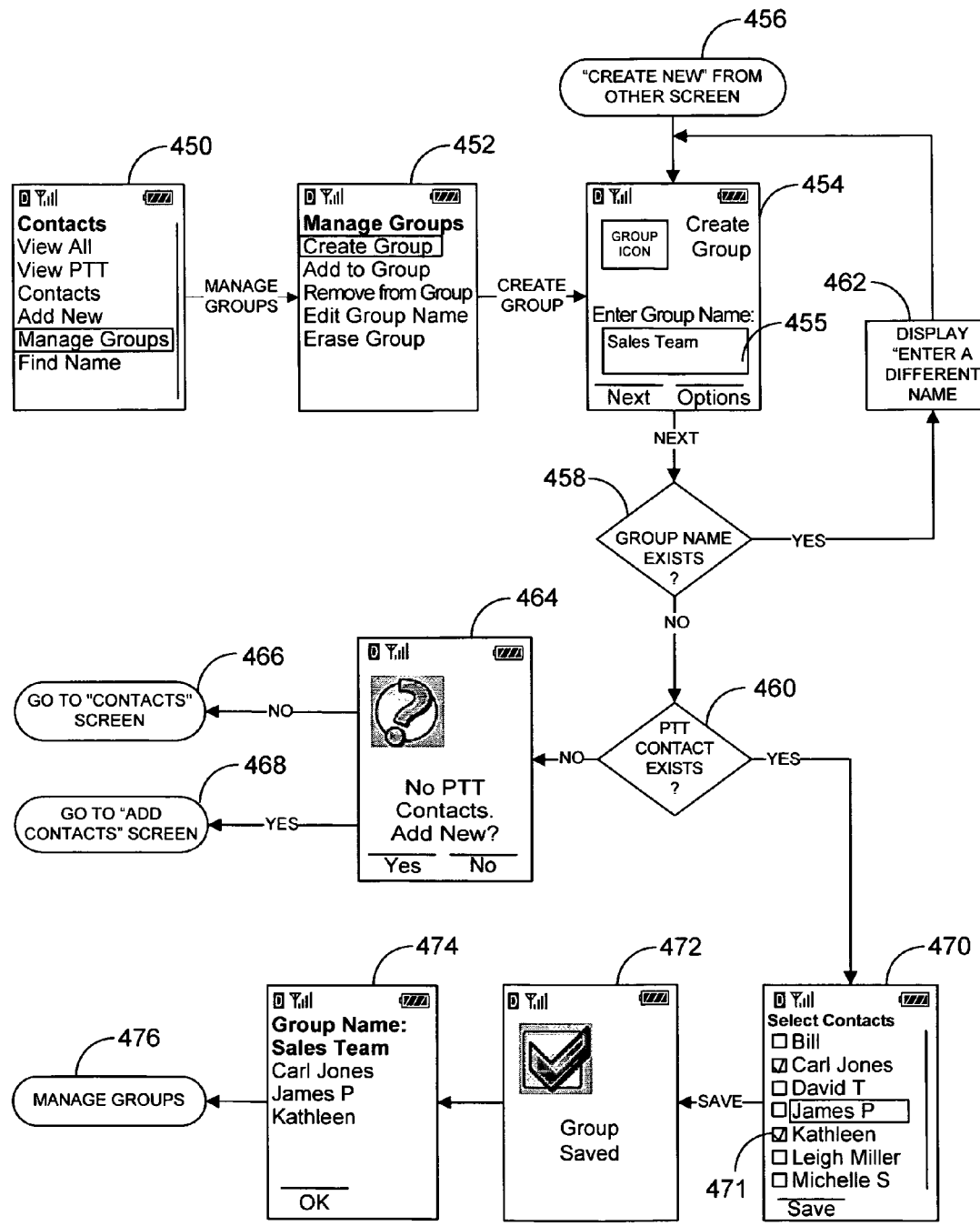
FIG. 28 illustrates a flow diagram of creating an "ad hoc" PTT group on the wireless communication device.

In contrast to group management of prior art systems, embodiments of the present invention allow a user to quickly manage group contact information. In prior art systems, groups are predefined, and must be established in advance of a call, many times through creation of the group with the wireless service provider. An embodiment of the present invention allows a user to create and store an "ad hoc" group on the handset as illustrated in FIG. 28. In a contacts screen 450, a user selects the "Manage Groups" option. The called manage groups screen 452 includes a number of option of creating a group, adding to a group, removing from a group, editing a group name and erasing from a group. Other embodiments of manage groups process may present more or fewer options.

In the example illustrated in the manage groups screen 452 of FIG. 28, the user selects to create a group. The create group screen 454 provides a field 455 to enter a group name. The manage group application then verifies whether the group name exists 458. If the group name exists 458, then the user is requested to enter a different group name 462, and the create group screen is displayed 454. The application then determines wither a PTT contact lists exists 460. If PTT contacts do not exist, then there are no contacts with which to create a PTT group. Therefore an error screen 464 informs the user that there are no PTT contacts, and asks whether the user wants to add new PTT contacts. If option "No" is selected, the display returns to the contacts screen, as shown in block 466. If option "Yes" is selected, the display advances to the add contacts screen, as shown in block 468.

Continuing with FIG. 28, if PTT contacts do exist in the contacts database, as shown in decision block 460, then the select contacts screen 470 is displayed. In one embodiment, only contacts that include a PTT address are shown, and no groups are shown. To select group members, the a name is highlighted, e.g., the scroll bar is scrolled down to the desired name, and a soft key such as "OK" is selected. The box icon 471 adjacent the name indicates a selection. Upon selection of all group members the save option is selected. A group save screen 472 verifies that the group was saved. Upon a time out or pressing a key, the group information is displayed in a group list screen 474. The user can select a back key or the "OK" key to return the user to the manage groups screen 452. A time out also can serve to return the user to the manage groups screen 452.

Figure 29:
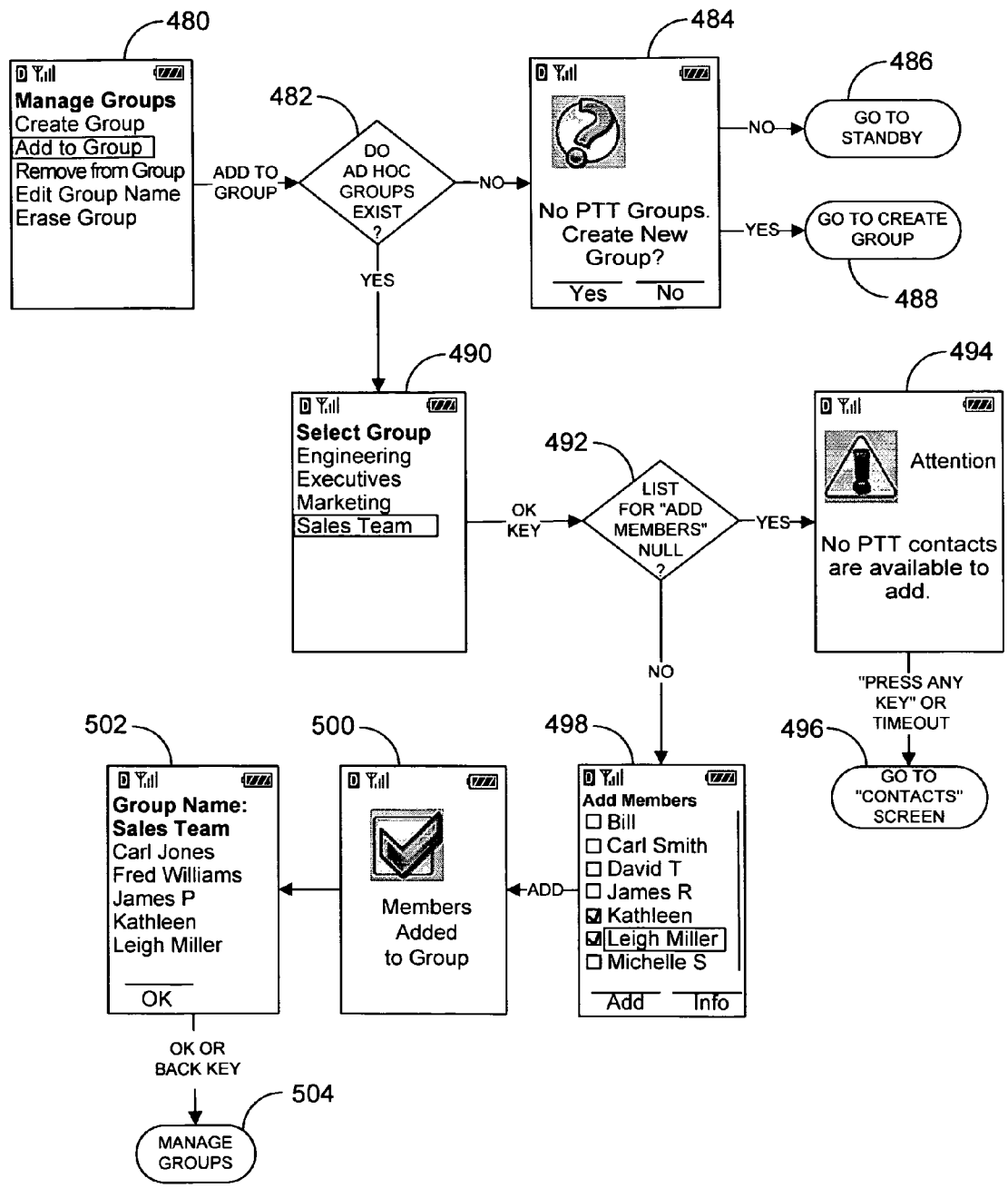
FIG. 29 illustrates a flow diagram of adding a member to an existing PTT group.

FIG. 29 illustrates a flow diagram of adding a member to an existing group. In the manage groups screen 480, the user selects "Add to Group". The manage groups application determines whether ad hoc groups exist 482, that is, groups created by the user. If groups do not exist, a status screen 484 informs the user that no groups exist, and asks the user if he or she wishes to create a new group. A selection of the yes option 486 forwards the user to a create group screen. A selection of the no option 488 puts the device in a standby state, or returns the user to a preceding screen, e.g., the manage groups screen 480. If add hoc groups exist, the a select group screen 490 is displayed.

As shown in the example of FIG. 29, four groups exist on the handset. The user selects one of the groups. The manage groups application determines whether there are PTT contact names available in the contacts database 492. If no contacts are available, the user is notified by an attention screen 494, and the user is returned to a preceding screen, such as the manage groups screen or the contacts screen, as shown in block 496. If PTT contacts are available, an add members screen 498 is presented to the user. All PTT contacts who are not members the selected group are shown. The user selects the members to be added, then completes the process by selecting the "Add" option. A status screen 500 verifies that the members are added to the group. A group name screen 502 then is display which shows the members of the selected group. The screen then reverts to a preceding screen such as the manage groups screen, as shown in block 504.

Figure 30:
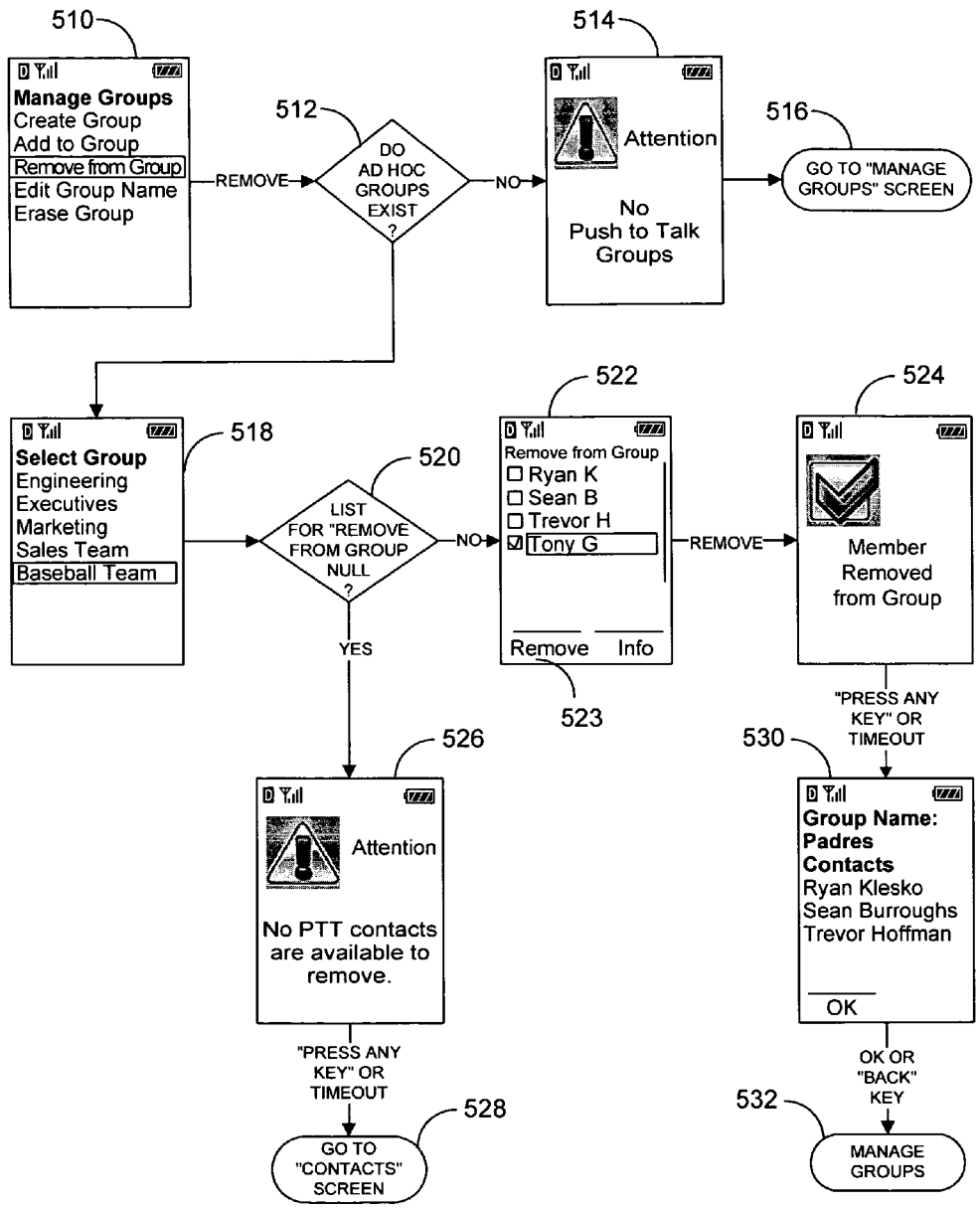
FIG. 30 illustrates a flow diagram of removing a member from an existing PTT group.

FIG. 30 illustrates a flow diagram of removing a member from an existing group. In the manage groups screen 510, a "Remove from Group" option is selected. The manage group routine checks for existing ad hoc groups 512. If no groups are saved in memory, then an attention screen 514 alerts the user, and returns to the manage groups screen 510. If at least one group exists, then the user can select a group from a select group screen 518. Only PTT ad hoc groups that are already on the handset are shown in one embodiment. Then in decision block 520, the manage group routine then verifies whether the group has any member that can be deleted. If a group has no members, that is, no PTT contacts, an attention screen 526 is displayed to alert the user. A time out will return the user to a previous screen such as the contacts screen, as shown in block 528. If members exist in the group, then the remove from group screen 522 is displayed. Only PTT contacts that are members of the group are shown. Initially, no member are checked. In one embodiment, highlighting the PTT contact and pressing "OK" will selects or deselect a member for deleting that member from the group. In the illustrated example of screen 522, "Tony G" is selected for removal. Selected the "Remove" option 423 removes the selected member or members from the group as verified in screen 524. The updated group list is then displayed in screen 430. Finally, the display returns to the manage groups screen 510. Removed members still exist in the PTT contact list, but are not part of the group.

Figure 31:
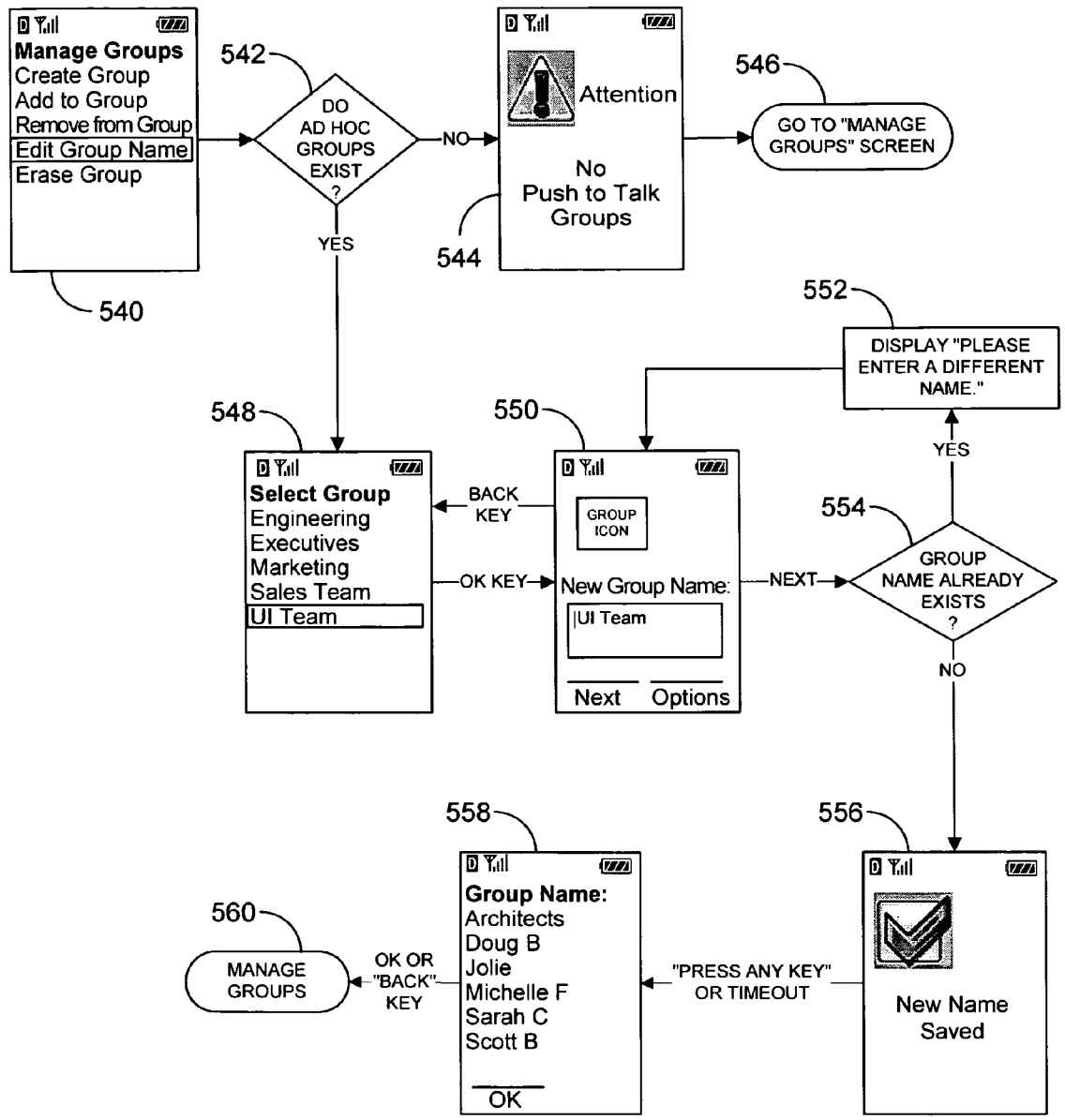
FIG. 31 illustrates a flow diagram of editing a PTT group name.

FIG. 31 illustrates a flow diagram of editing a group name. In the manage groups screen 540, an "Edit Group Name" option is selected. If ad hoc groups exist on the handset, as shown in decision block 542, then a select group screen is presented 548. The user selects a group, and is presented with a new group name field 551 on a new group name screen 550. In one embodiment, the existing name is shown in the field 551 for editing. if the group name already exists, as shown in decision block 554, then the user is alerted to enter a different name 552. IF the group dame does not exist, then verification of saving the new name is displayed 556, and the group name screen 558 is displayed so that the user may verify the new name. The screen is then returned to a preceding screen such as the manage groups screen as shown in block 560.

Figure 32:
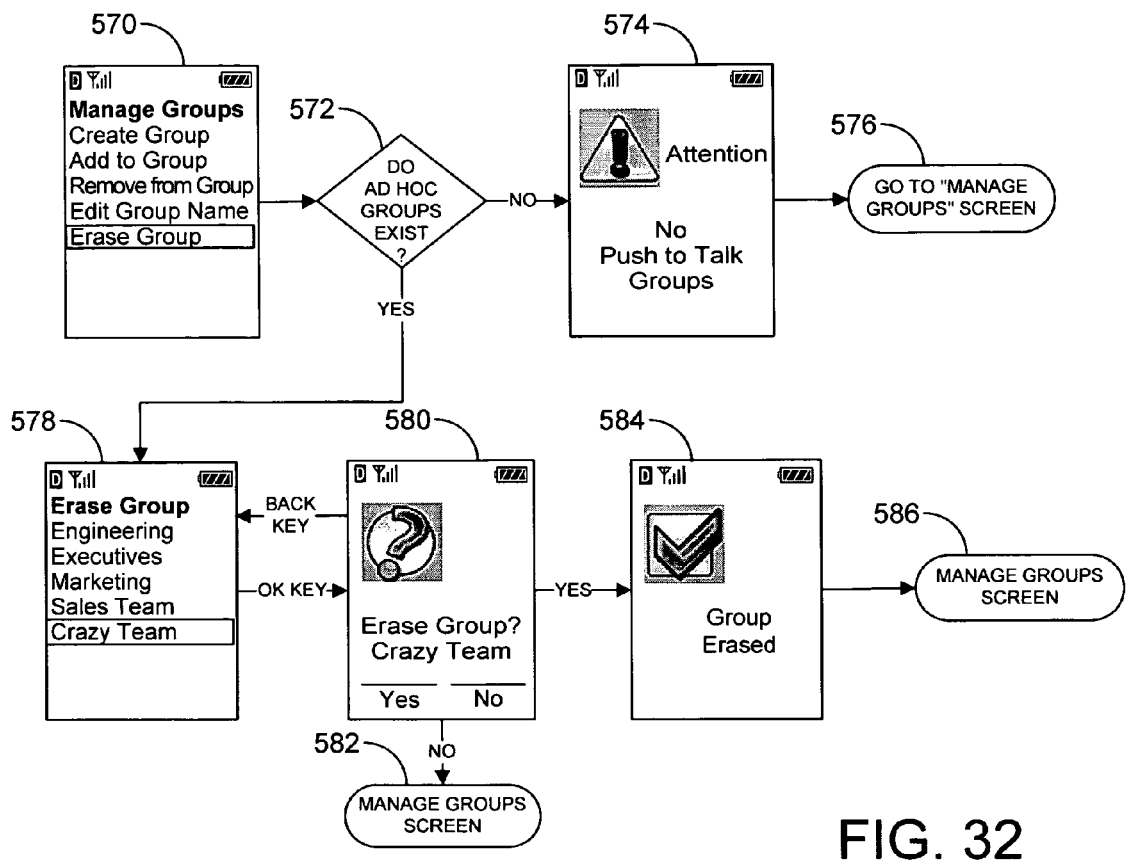
FIG. 32 illustrates a flow diagram of erasing a group from the database.

FIG. 32 illustrates a flow diagram of erasing a group from the database. In a manage groups screen 570, the user selects to erase a group. If groups do not exists 572, then the user is alerted by an attention screen 574, and the display returns to the manage groups screen, as shown in block 576. If groups exist in a memory, the user selects a group in an erase groups screen 578. A verification screen 580 is presented to verify that the user wants to erase the selected group. Selection of a no option returns the user back to the manage group screen as shown in block 582. Selection of a yes option erases the group as verified by a group erased screen 584. Upon a timeout or a selection of a key, the display returns to the manage groups screen, as shown in block 586. Although the group no longer exists, the members of the erased group continue to exist in the PTT contact list.

Figure 34:
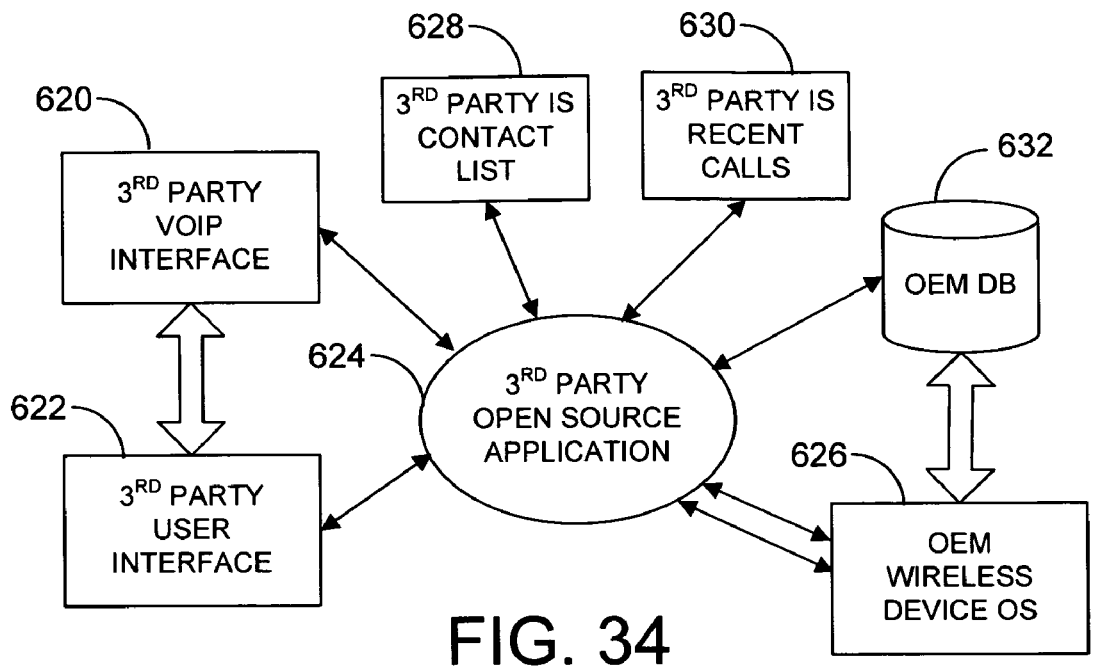
FIG. 34 illustrates use of a third party user interface and application for enabling PTT of the prior art.

FIG. 34 illustrates the architecture of a system of the prior art for realizing a PTT capability. A third party open source application 624, such as Qualcomm's BREW (Binary Runtime Environment for Wireless), is a development platform for wireless devices equipped for code division multiple access CDMA technology. This application 624 allows developers to create portable applications that will work on handsets equipped with CDMA chipsets. The application 624 runs between a third party voice over internet protocol (VOIP) interface 620 and the chip operating system software 626 on the handset. The open source application 624 uses the device's functionality without the need to code a system interface. The application can be used with downloaded applications such as text chat, enhanced e-mail, location positioning, games, etc., from carrier networks. The third party open source application 624 uses a third party user interface 622. A contact list 628 and a recent calls list 630 is also maintained by the third party application. A handset database 632 stores the contact information that is made available through the third party sources 628, 630, 622, 620. When used in a push to talk environment, the prior art open source applications do not allow easy-to-use interfaces for storing, manipulating and using contact information to initiate PTT calls.

Figure 35:
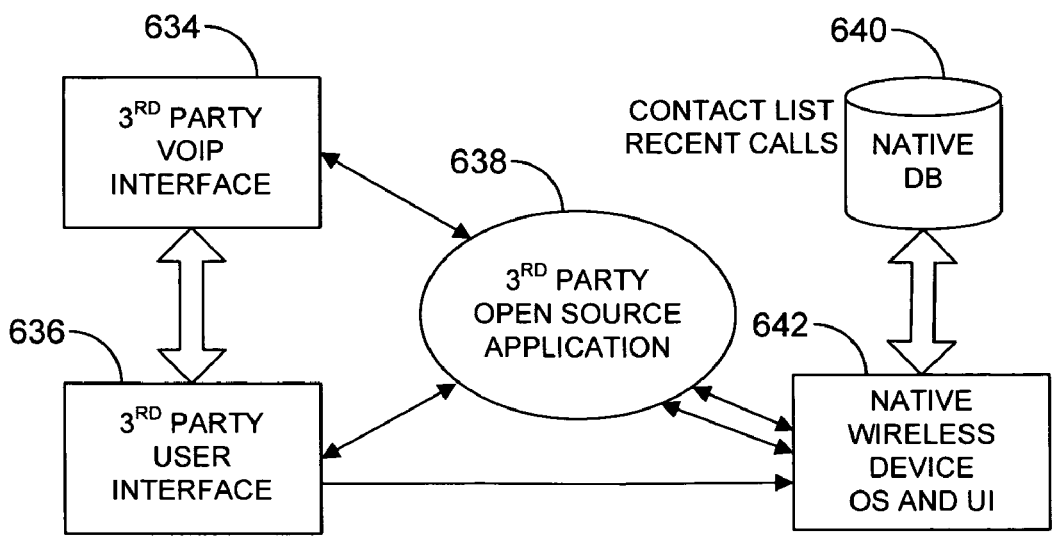
FIG. 35 illustrates use of a native database and user interface for enabling PTT of an embodiment of the present invention.

FIG. 35 illustrates a block diagram of the software architecture of an embodiment of the present invention for use in a PTT environment. In this architecture the contact list and recent calls list is not maintained through the third party open source application 638, 634 and third party user interface 636. Rather a native software operating system and user interface 642 on the handset maintains a recent calls list and a contact list in a single native database 640. Contact information is gathered directly from the third party user interface 636. The native software operating can then use the contact information to create a user friendly PTT user interface, as discussed herein, that is compatible with the native handset screen presentations.

Figure 36:
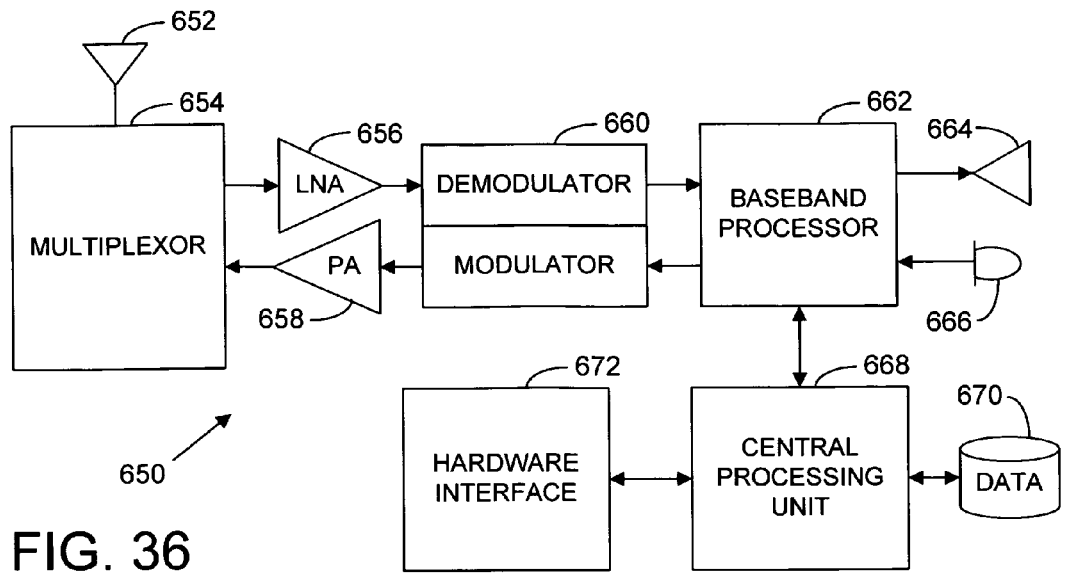
FIG. 36 is a block diagram illustrating a wireless communication device that may be used in connection with various PTT embodiments described herein.

FIG. 36 is a block diagram illustrating a wireless communication device 650 that may be used in connection with the various embodiments described herein. For example, the wireless communication device 650 may be used in conjunction with a handset or PDA network device or as a part of a sensor node in a wireless mesh network. However, other wireless communication devices and/or architectures may also be used, as will be clear to those skilled in the art. In the illustrated embodiment, wireless communication device 650 comprises an antenna 652, a multiplexor 654, a low noise amplifier ("LNA") 656, a power amplifier ("PA") 658, a modulation circuit 660, a baseband processor 662, a speaker 664, a microphone 666, a central processing unit ("CPU") 668, a data storage area 670, and a hardware interface 672. In the wireless device 650, radio frequency ("RF") signals are transmitted and received by antenna 652. Multiplexor 654 acts as a switch, coupling antenna 652 between the transmit and receive signal paths. In the receive path, received RF signals are coupled from a multiplexor 654 to LNA 656. LNA 656 amplifies the received RF signal and couples the amplified signal to a demodulation portion of the modulation circuit 660. The demodulator strips away the RF carrier signal leaving a base-band receive audio signal, which is sent from the demodulator output to the base-band processor 662.

If the base-band receive audio signal contains audio information, then base-band processor 662 decodes the signal, converts it to an analog signal, and sends it to the speaker 664. The base-band processor 662 also receives analog audio signals from the microphone 666. These analog audio signals are converted to digital signals and encoded by the base-band processor 662. The base-band processor 662 also codes the digital signals for transmission and generates a base-band transmit audio signal that is routed to the modulator portion of modulation circuit 660. The modulator mixes the base-band transmit audio signal with an RF carrier signal generating an RF transmit signal that is routed to the power amplifier 658. The power amplifier 658 amplifies the RF transmit signal and routes it to the multiplexor 654 where the signal is switched to the antenna port for transmission by antenna 652.

Continuing with FIG. 36, the baseband processor 662 is also communicatively coupled with the central processing unit 668 which has access to a data storage area 670. The central processing unit 668 is configured to execute instructions (i.e., computer programs or software) that can be stored in the data storage area 670. Computer programs can also be received from the baseband processor 662 and stored in the data storage area 670 or executed upon receipt. Such computer programs, when executed, enable the wireless communication device 650 to perform the various functions of the present invention as previously described.

Figure 37:
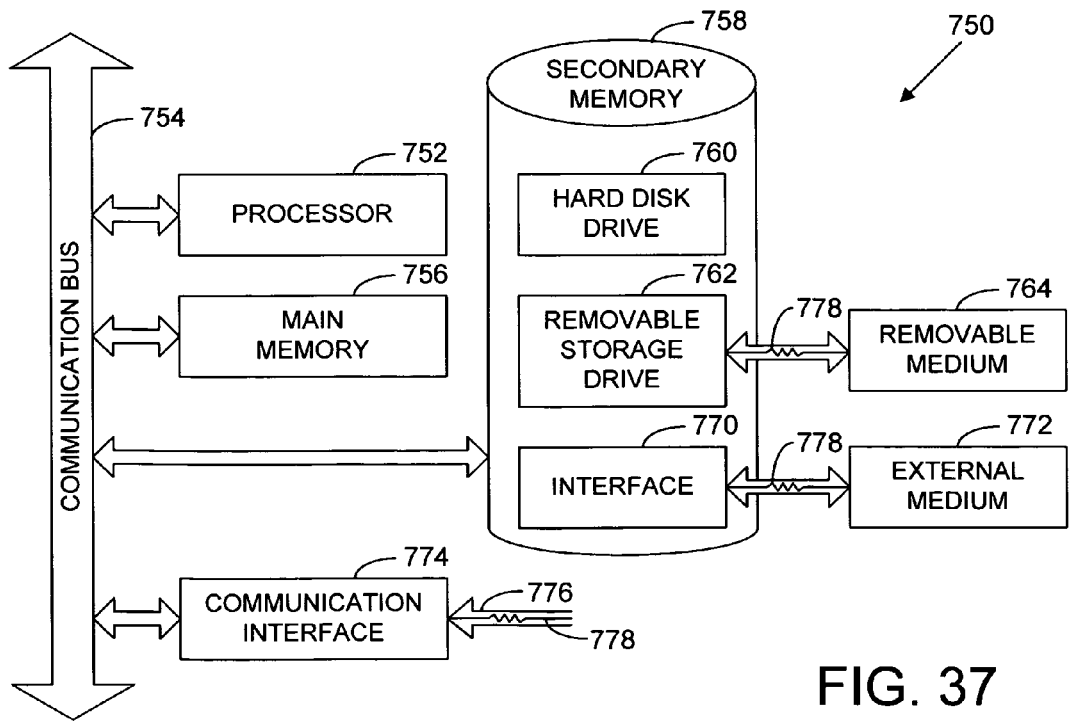
FIG. 37 is a block diagram of a computer system that may be used with a PTT embodiments described herein.

FIG. 37 is a block diagram illustrating a computer system 750 that may be used in connection with the various embodiments described herein. However, other computer systems and/or architectures may be used, as will be clear to those skilled in the art. The computer system 750 includes one or more processors 752 which is connected to a standard or non-standard communication bus 754. Computer system 750 includes a main memory 756 and may also include a secondary memory 758. The main memory 756 provides storage of instructions and data for programs executing on the processor 752. The secondary memory 758 may include, for example, a hard disk drive 760 or a removable storage drive 762 used with a removable medium 764. In alternative embodiments, secondary memory 758 may include other external storage medium 772 and an interface 770 for allowing computer programs or other data or instructions to be loaded into the computer system 750.

Computer system 750 may also include a communication interface 774 which allows software and data to be transferred between computer system 750 and external devices (e.g. printers), networks, or information sources. Software and data transferred via communication interface 774 are generally in the form of electrical communication signals 778 provided to communication interface 774 via a communication channel 776. Communication channel 776 carries signals 778 and can be implemented using a variety of communication means including wire or cable, fiber optics, conventional phone line, cellular phone link, radio frequency (RF) link, or infrared link, etc.

The description and drawings contained herein are particular embodiments of the invention and are representative of the subject matter broadly contemplated by the invention. However, the invention encompasses other embodiments that will be obvious to those skilled in the art. Accordingly, the scope of the invention is limited only by the appended claims.

We claim:

1. A method for participating in a call on a wireless communications device, the method comprising the steps of:
    adding contact information to a single contacts database, the contact information comprising a plurality of contact names, and at least one of a PTT contact number and a standard phone number associated with each contact name of the plurality of contact names;
    displaying a selection screen comprising one of a standard phone number contacts list screen and a PTT contacts list screen, the standard phone number contacts list screen for displaying a plurality of standard phone number contact names associated with a standard phone number, the PTT contacts list screen for displaying the each contact name having the PTT contact number;
    initiating a PTT call to a plurality of selected PTT contacts to be called by selecting the plurality of selected PTT contacts through the PTT contacts list screen;
    displaying an in-call screen when the initiated PTT call is connected to the plurality of selected PTT contacts to be called, the in-call screen providing a group soft key option;
    accepting a selection of the group soft key option;
    displaying a contacts management screen in response to the selection of the group soft key option; and
    updating the single contacts database through the contacts management screen while continuing to participate in the connected PTT call.

2. The method of claim 1, wherein the standard phone number is a land line number or a cellular number.

3. The method of claim 1, wherein the step of adding contact information comprises the steps of:
    creating a PTT group contact comprising a subset of only the plurality of contact names having the PTT contact number; and
    assigning a name to the PTT group contact; wherein the PTT contacts list screen display the PTT group contact name.

4. The method of claim 3, further comprising the step of: initiating a PTT call to the PTT group contact.

5. The method of claim 1, further comprising the step of:
    creating a PTT adhoc group by selecting a plurality of PTT contacts from the PTT contacts list screen.

6. The method of claim 1, wherein the step for initiating a PTT Call comprises pushing a PTT button on the wireless communications device.

7. The method of claim 1, wherein the step of displaying a selection screen comprises the step of:
    displaying a selection screen comprising one of a standard phone number contacts list screen, a PTT contacts list screen, and a call history screen.

8. The method of claim 1, further comprising the steps of:
    displaying in-call screens when the initiated PTT call is connected to the selected PTT contact to be called, the in-call screens providing type of call information, call status information, and soft key options.

9. The method of claim 8, further comprising the steps of:
    selecting a soft key option comprising at least one of a menu option, a contacts option, and a group option;
    displaying a contacts management screen in response to the selection of the soft key; and
    updating the single contacts database through the contacts management screen while continuing to participate in the connected PTT call.

10. The method of claim 1, wherein the step of initiating a PTT call to the selected PTT contact to be called further comprises the step of:
    selecting an alert option to send an alert to the selected PTT contact to be called.

11. The method of claim 10, wherein the alert message comprises a text message.

12. The method of claim 1, further comprising the steps of:
    displaying in-call screens when the initiated PTT call is connected to the selected PTT contact to be called, the in-call screens providing type of call information, call status information, and a plurality of soft key options;
    selecting a soft key option of the plurality of soft key options, the soft key option calling up the PTT contacts lists screen;
    selecting an additional PTT contact to be called from the plurality of PTT contact names on the PTT contacts list screen; and
    selecting a join soft key to add the additional PTT contact to be called to the connected PTT call.

13. A method for participating in a call on a wireless communications device, the method comprising the steps of:
    receiving a group PTT call from a calling party;
    displaying in-call screens to provide call status information comprising a listening status, a talking status, and a floor free status;
    pressing a PTT button to "seize the floor" and to enter into the talking status;
    releasing the PTT button to enter into one of the listening status and the floor free status;
    updating contact information for the calling party in a single contacts database, the contact information comprising a name for the calling party and at least one of a PTT contact number and a standard phone number associated with the calling party;
    displaying a selection screen comprising one of a standard phone number contacts list screen and a PTT contacts list screen, the standard phone number contacts list screen for displaying a plurality of standard phone number contact names associated with a standard phone number, the PTT contacts list screen for displaying only each contact name having the PTT contact number;

displaying an in-call screen when the received group PTT call is connected, the in-call screen providing a group soft key option;

accepting a selection of the group soft key option;

displaying a contacts management screen in response to the selection of the group soft key option; and updating the single contacts database through the contacts management screen while continuing to participate in the connected group PTT call.

14. The method of claim 13, further comprising the step of: verifying the contact information on the selection screen.

15. The method of claim 13, wherein the calling party is a single party, and the step of updating contact information comprises updating the contact information for the single party.

16. The method of claim 13, wherein the calling party is a group, and the step of updating contact information comprises:

adding group contact information to the single contacts database for the group.

17. A wireless communications device for participating in a call, the wireless communications device comprising:

a single native database for storing contact information, the contact information comprising a plurality of contact names, and at least one of a PTT contact number and a standard phone number associated with each contact name of the plurality of contact names;

a native user interface comprising:

a standard phone number contacts list screen for displaying a plurality of standard phone number contact names associated with a standard phone number, the standard phone number contacts list screen having means for selecting at least one standard phone number contact name of the plurality of standard phone number contact names;

a PTT contacts list screen for displaying a plurality of PTT contact names, the plurality of PTT contact names comprising the each contact name having the PTT contact number, the PTT contacts list screen having means for selecting at least one PTT contact name of the plurality of PTT contact names;

at least one manage contacts screen for adding a new contact name to the plurality of contact names, and for editing an existing contact name of the plurality of contact names;

a means for initiating one of an alert call and a PTT call to one of the selected at least one standard phone number contact name and the selected at least one PTT contact name;

an in-call screen display to be displayed when a PTT call is connected to a plurality of PTT contacts, the in-call screen providing a group soft key option;

a contacts management screen to be displayed in response to selection of the group soft key option; and a means for updating the single native database through the contacts management screen while continuing to participate in the connected PTT call with the plurality of PTT contacts.

18. The device of claim 17, wherein the PTT contacts list screen further comprises at least one PTT group contact name, the PTT group contact name associated with a group subset of the plurality of PTT contact names.

19. The device of claim 17, wherein The PTT contacts list screen further comprises means for selecting a group of PTT contact names from the plurality of PTT contact names; and wherein the means for initiating the PTT call is utilized to initiate a group ad hoc PTT call to the selected group of PTT contact names.

* * * * *